(12) United States Patent
Mizuhashi et al.

(10) Patent No.: US 10,572,050 B2
(45) Date of Patent: Feb. 25, 2020

(54) DISPLAY DEVICE IN WHICH CONTROL SIGNALS SUPPLIED TO FIRST AND SECOND SWITCHES ARE MADE THE SAME IN AN INPUT SENSING OPERATION

(71) Applicant: Japan Display Inc., Minato-ku (JP)

(72) Inventors: Hiroshi Mizuhashi, Minato-ku (JP); Tadayoshi Katsuta, Minato-ku (JP); Gen Koide, Minato-ku (JP); Toshiaki Fukushima, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/149,190

(22) Filed: Oct. 2, 2018

(65) Prior Publication Data

US 2019/0034016 A1 Jan. 31, 2019

Related U.S. Application Data

(63) Continuation of application No. 15/626,619, filed on Jun. 19, 2017, now Pat. No. 10,146,348, which is a
(Continued)

(30) Foreign Application Priority Data

Jun. 5, 2014 (JP) ................................. 2014-116881

(51) Int. Cl.
*G06F 3/041* (2006.01)
*G09G 3/36* (2006.01)
*G06F 3/044* (2006.01)

(52) U.S. Cl.
CPC ............ *G06F 3/0412* (2013.01); *G06F 3/044* (2013.01); *G09G 3/3648* (2013.01);
(Continued)

(58) Field of Classification Search
None
See application file for complete search history.

(56) References Cited

U.S. PATENT DOCUMENTS 6,069,605 A * 5/2000 Ozawa ................. G09G 3/3614
345/100
2011/0267293 A1 11/2011 Noguchi et al.
(Continued)

FOREIGN PATENT DOCUMENTS

CN 101866228 A 10/2010
CN 102419670 A 4/2012
(Continued)

OTHER PUBLICATIONS

Combined Office Action and Search Report dated Nov. 29, 2017 in Chinese Patent Application No. 201510260597.8 (w/English language translation), 20 pages.

*Primary Examiner* — Gustavo Polo
(74) *Attorney, Agent, or Firm* — Oblon, McClelland, Maier & Neustadt, L.L.P.

(57) ABSTRACT

According to one embodiment, a display device includes first and second substrate units, a display function layer, and a drive element. The first substrate unit includes a first substrate, a display unit, and a circuit unit. The first substrate has a first surface including a display region and a peripheral region. The display unit is provided in the display region, and includes first lines, second lines, switch elements, pixel electrodes, and third lines. The circuit unit is provided in the peripheral region, and is electrically connected to one of the second lines and one of the third lines. The second substrate unit includes a second substrate and fourth lines. The display function layer is provided between the first and second substrate units. The drive element is provided on the periph-
(Continued)

eral region. At least a portion of the circuit unit is disposed between the drive element and the first substrate.

10 Claims, 11 Drawing Sheets

Related U.S. Application Data continuation of application No. 14/708,761, filed on May 11, 2015, now Pat. No. 9,715,295.

(52) U.S. Cl.
CPC ..... *G09G 3/3685* (2013.01); *G09G 2300/023* (2013.01); *G09G 2300/0426* (2013.01); *G09G 2300/0876* (2013.01); *G09G 2310/0297* (2013.01); *G09G 2310/08* (2013.01)

(56) References Cited

U.S. PATENT DOCUMENTS

| | | |
|---|---|---|
| 2012/0050659 A1 | 3/2012 | Nakanishi et al. |
| 2012/0075238 A1 | 3/2012 | Minami et al. |
| 2012/0262387 A1 | 10/2012 | Mizuhashi et al. |
| 2014/0152616 A1 | 6/2014 | Kida et al. |
| 2015/0356911 A1 | 12/2015 | Mizuhashi et al. |

FOREIGN PATENT DOCUMENTS

| | | |
|---|---|---|
| CN | 102967977 A | 3/2013 |
| JP | 2011-233018 | 11/2011 |
| JP | 2012-047807 | 3/2012 |
| JP | 2012-230657 | 11/2012 |
| JP | 2014-132446 | 7/2014 |

\* cited by examiner

DISPLAY DEVICE IN WHICH CONTROL SIGNALS SUPPLIED TO FIRST AND SECOND SWITCHES ARE MADE THE SAME IN AN INPUT SENSING OPERATION

CROSS-REFERENCE TO RELATED APPLICATIONS

This application is a continuation of and claims the benefit of priority under 35 U.S.C. § 120 from U.S. application Ser. No. 15/626,619 filed Jun. 19, 2017, which is a continuation of U.S. application Ser. No. 14/708,761 filed May 11, 2015 (now U.S. Pat. No. 9,715,295 issued Jul. 25, 2017), which claims the benefit of priority under 35 U.S.C. § 119 from Japanese Patent Application No. 2014-116881 filed on Jun. 5, 2014; the entire contents of each of which are incorporated herein by reference.

FIELD

Embodiments described herein relate generally to a display device.

BACKGROUND

A display device that uses a liquid crystal, organic EL, etc., has been developed. Other a display operation, for example, a sense operation of a touch input may be performed in the display device. A compact device is desirable for such a display device.

SUMMARY OF THE INVENTION

According to one embodiment, a display device includes a first substrate unit, a second substrate unit, a display function layer, and a drive element. The first substrate unit includes a first substrate, a display unit, and a circuit unit. The first substrate has a first surface including a display region and a peripheral region. The display unit is provided in the display region. The display unit includes a plurality of first lines extending in a first direction and being arranged in a second direction intersecting the first direction, the first direction intersecting a direction from the peripheral region toward the display region, a plurality of second lines extending in the second direction and being arranged in the first direction, a plurality of switch elements, each of the plurality of switch elements being electrically connected to one of the plurality of first lines and one of the plurality of second lines, a plurality of pixel electrodes electrically connected respectively to the plurality of switch elements, and a plurality of third lines extending in the second direction and being arranged in the first direction. A circuit unit is provided in the peripheral region. A circuit unit is electrically connected to at least one of the plurality of second lines and at least one of the plurality of third lines. The second substrate unit includes a second substrate and a plurality of fourth lines. The second substrate has a second surface and a third surface. The second surface opposes the first surface. The third surface is on a side opposite to the second surface. The plurality of fourth lines is provided at the third surface. The plurality of fourth lines extends in a third direction and is arranged in a fourth direction. The third direction is parallel to the third surface and intersects the second direction. The fourth direction is parallel to the third surface and intersects the third direction. The display function layer is provided between the first substrate unit and the second substrate unit. The display function layer performs an optical operation based on an electrical signal applied to the plurality of pixel electrodes. The drive element is provided on the peripheral region. The drive element is capable of outputting the electrical signal to the circuit unit. At least a portion of the circuit unit is disposed between the drive element and the first substrate.

DETAILED DESCRIPTION

Figure 1A:
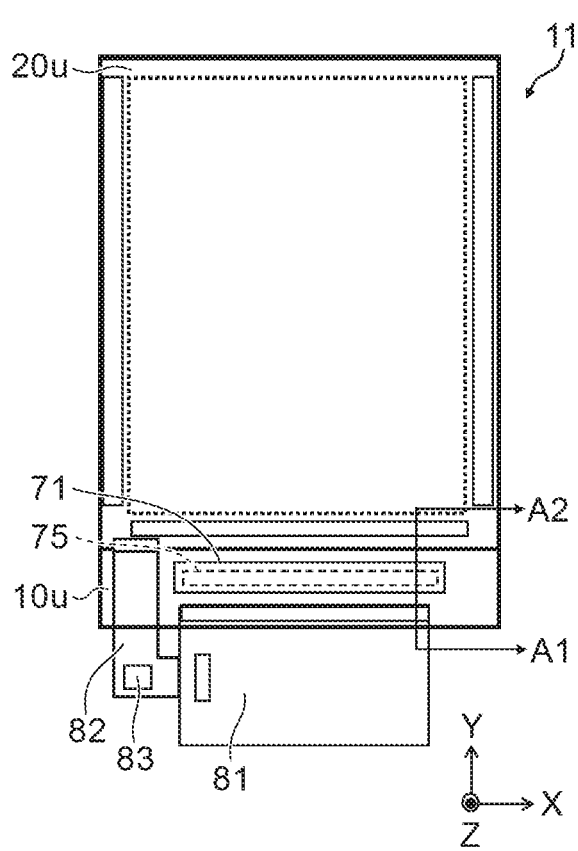
FIG. 1A to FIG. 1C are schematic plan views showing a display device according to a first embodiment.

Embodiments of the invention will now be described with reference to the drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

Figure 1B:
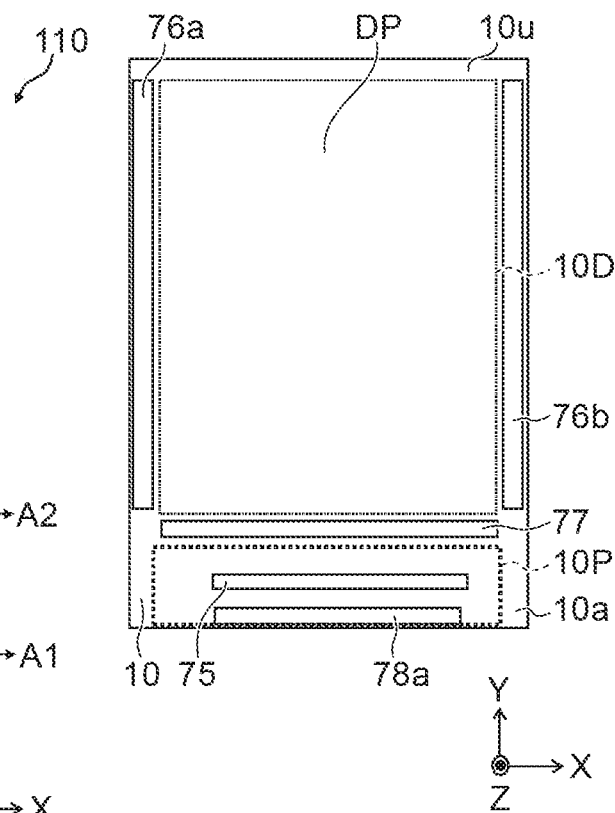
Figure 1C:
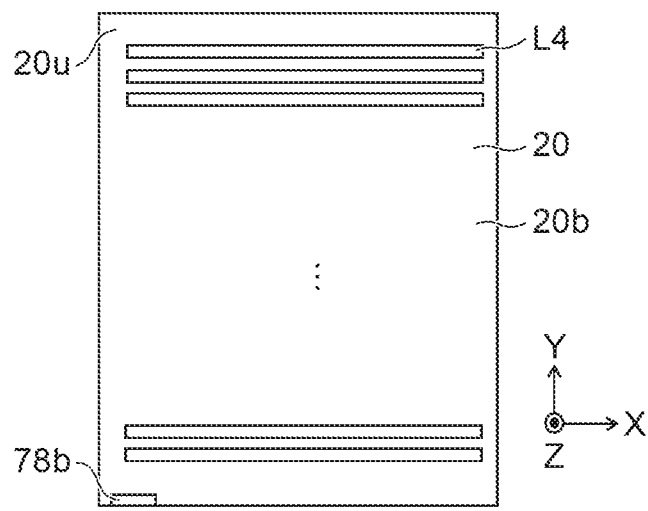

FIG. 1A to FIG. 1C are schematic plan views showing a display device according to a first embodiment.

As shown in FIG. 1A, the display device 110 according to the embodiment includes a first substrate unit 10u, a second substrate unit 20u, and a drive element 71.

FIG. 1B shows the first substrate unit 10u. The first substrate unit 10u includes a first substrate 10, a display unit DP, and a circuit unit 75. The first substrate 10 has a first surface 10a. A display region 10D and a peripheral region 10P are provided on the first surface 10a side of the first substrate 10. The display unit DP is provided on the display region 10D. The circuit unit 75 is provided on the peripheral region 10P.

As described below, various lines, switch elements, and pixel electrodes are provided in the display unit DP. An example of the display unit DP is described below.

For example, one direction intersecting a direction from the peripheral region 10P toward the display region 10D is taken as a first direction. The first direction is parallel to the first surface 10a. The direction described above from the peripheral region 10P toward the display region 10D is taken as a second direction. A direction perpendicular to the first direction and the second direction is taken as a fifth direction.

The first direction is taken as an X-axis direction. A direction parallel to the first surface 10a and perpendicular to the X-axis direction is taken as a Y-axis direction. A direction perpendicular to the X-axis direction and the Y-axis direction is taken as a Z-axis direction. As described below, the Y-axis direction corresponds to the second direction; and the Z-axis direction corresponds to the fifth direction.

A display is performed in the display region 10D. In the example shown in FIG. 1B, the first substrate unit 10u further includes a first gate driver 76a, a second gate driver 76b, and a multiplexer 77. The display region 10D is disposed in the region between the first gate driver 76a and the second gate driver 76b. The multiplexer 77 is disposed between the display region 10D and the circuit unit 75.

The first substrate unit 10u further includes a first substrate connector unit 78a. The first substrate connector unit 78a is provided in the peripheral region 10P of the first substrate 10. For example, the first substrate connector unit 78a is electrically connected to at least one of the circuit unit 75 or the gate drivers.

In the embodiment, the state of being electrically connected includes the state in which two conductors are in direct contact, and the state in which a current flows between two conductors that have another conductor inserted therebetween. Further, the state of being electrically connected includes the state in which it is possible to form a state in which a current flows between two conductors that have an element (e.g., a switch element or the like) inserted therebetween.

FIG. 1C shows the second substrate unit 20u. The second substrate unit 20u includes a second substrate 20 and multiple lines (fourth lines L4 described below). The second substrate 20 has a second surface 20a (referring to FIG. 2) and a third surface 20b. The second surface 20a is the surface that opposes the first surface 10a. The third surface 20b is the surface on the side opposite to the second surface 20a. The fourth lines L4 are provided in the third surface 20b. As described below, the fourth lines L4 are used to sense a touch input. A second substrate connector unit 78b is provided in the second substrate 20. The second substrate connector unit 78b is electrically connected to the fourth lines L4.

In the example shown in FIG. 1A, the display device 110 further includes a first circuit substrate 81, a second circuit substrate 82, and a sensor 83 (e.g., a touch sensing IC). The first circuit substrate 81 is electrically connected to the first substrate connector unit 78a. The second circuit substrate 82 is electrically connected to the second substrate connector unit 78b. In the example shown in FIG. 1A, the sensor 83 is mounted on the second circuit substrate 82. For example, FPCs (Flexible Printed Circuits) are used as these circuit substrates. The sensor 83 and the drive element 71 can operate synchronously with each other.

As shown in FIG. 1A, the drive element 71 is provided on the peripheral region 10P of the first substrate 10. For example, the drive element 71 and the second substrate unit 20u do not overlap in the plane, even when the drive element 71 and the first surface 10a overlap in the plane.

Figure 2:
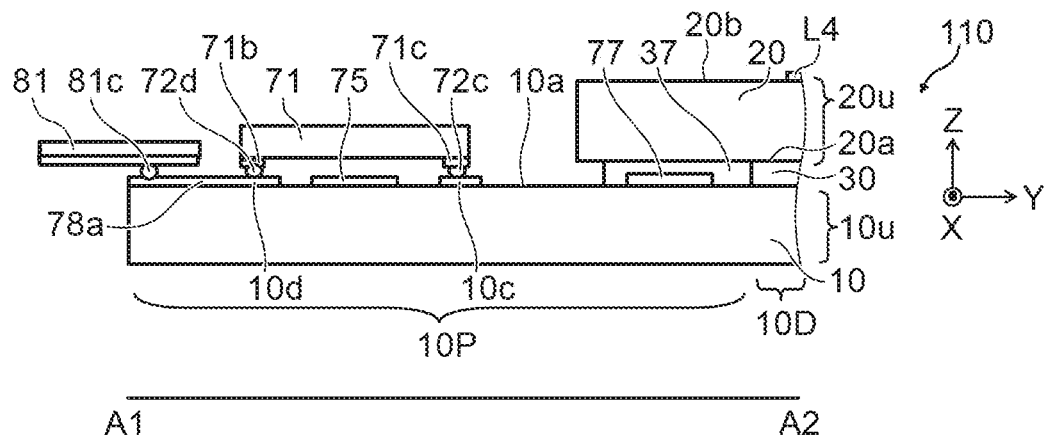
FIG. 2 is a schematic cross-sectional view showing the display device according to the first embodiment.

FIG. 2 is a schematic cross-sectional view showing the display device according to the first embodiment.

FIG. 2 shows a line A1-A2 cross section of FIG. 1A.

As shown in FIG. 2, the drive element 71 is provided on the peripheral region 10P of the first substrate 10. At least a portion of the circuit unit 75 is disposed between the drive element 71 and the first substrate 10. In other words, the drive element 71 is disposed on at least a portion of the circuit unit 75.

Thereby, the surface area of the peripheral region 10P can be small compared to the case where the circuit unit 75 and the drive element 71 do not overlap each other. Thereby, the device can be compact.

For example, the drive element 71 includes a lower surface electrode 71c and another lower surface electrode 71d. The lower surface electrodes 71c and 71d are provided on the surface of the drive element 71 on the first substrate 10 side. On the other hand, the first substrate unit 10u includes an line electrode 10c and another line electrode 10d. The line electrodes 10c and 10d are provided in the peripheral region 10P.

The display device 110 further includes a connecting conductive member 72c and another connecting conductive member 72d. The connecting conductive member 72c is disposed between the lower surface electrode 71c and the line electrode 10c and electrically connects the lower surface electrode 71c and the line electrode 10c. The connecting conductive member 72d is disposed between the lower surface electrode 71d and the line electrode 10d and electrically connects the lower surface electrode 71d and the line electrode 10d.

For example, a glass substrate may be used as the first substrate 10. For example, the drive element 71 is mounted on the first substrate 10 by a COG (Chip on Glass) method.

In the example shown in FIG. 2, the first substrate connector unit 78a and the first circuit substrate 81 are connected by a connection member 81c.

As shown in FIG. 2, a display function layer 30 is disposed between the first substrate unit 10u and the second substrate unit 20u. In the example, a sealing unit 37 is provided between the first substrate unit 10u and the second substrate unit 20u. For example, the sealing unit 37 bonds the first substrate 10 and the second substrate 20. In the example, the multiplexer 77 (at least a portion of the multiplexer 77) contacts the sealing unit 37. Thereby, the surface area of the regions other than the display region 10D can be reduced.

An example of the various lines, switch elements, and pixel electrodes provided in the display unit DP will now be described.

Figure 3:
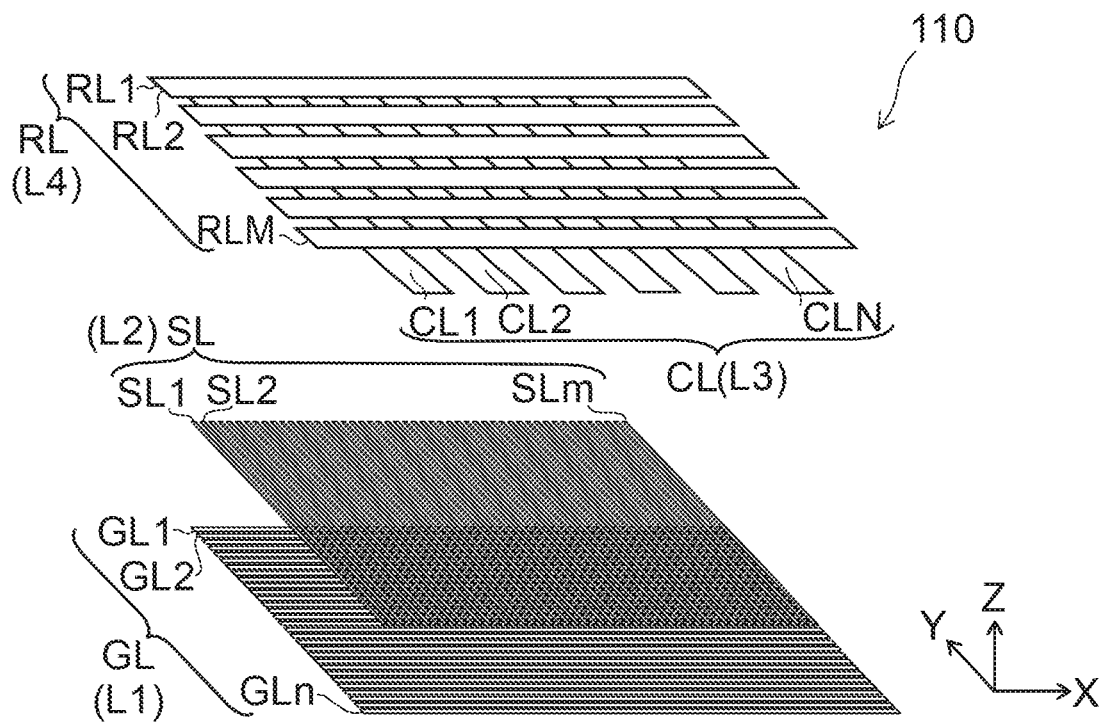
FIG. 3 is a schematic perspective view showing the display device according to the first embodiment.

FIG. 3 is a schematic perspective view showing the display device according to the first embodiment.

As shown in FIG. 3, the display device 110 according to the embodiment includes multiple first lines L1 (e.g., gate lines GL), multiple second lines L2 (e.g., signal lines SL), and multiple third lines L3 (e.g., common lines CL). The first lines L1, the second lines L2, and the third lines L3 are included in the display unit DP. The multiple fourth lines L4 also are shown in FIG. 3.

Each of the multiple first lines L1 extends in the first direction. As described above, the first direction is the direction intersecting the direction from the peripheral region 10P toward the display region 10D. The multiple first lines L1 are arranged in the second direction. The second direction intersects the first direction. In the example, the second direction is perpendicular to the first direction. The first direction is parallel to the X-axis direction; and the second direction is parallel to the Y-axis direction.

Each of the multiple second lines L2 extends in the second direction. The multiple second lines L2 are arranged in the first direction.

Each of the multiple third lines L3 extends in the second direction. The multiple third lines L3 are arranged in the first direction.

The multiple fourth lines L4 are separated from the first to third lines L1 to L3 in a direction (a Z-axis direction, i.e., the fifth direction) perpendicular to the X-Y plane. Each of the multiple fourth lines L4 extends in a third direction. The third direction is parallel to the X-Y plane and intersects the second direction. The multiple fourth lines L4 are arranged in a fourth direction. The fourth direction is parallel to the X-Y plane and intersects the third direction. In the example, the third direction is parallel to the X-axis direction; and the fourth direction is parallel to the Y-axis direction.

As described above, for example, the multiple first lines L1 are the gate lines GL. The multiple gate lines GL include, for example, a first gate line GL1, a second gate line GL2, and an nth gate line GLn. The number of gate lines GL is n. n is an integer not less than 2. For example, n is 2560. In the embodiment, n is arbitrary.

As described above, for example, the multiple second lines L2 are the signal lines SL. The multiple signal lines SL include, for example, a first signal line SL1, a second signal line SL2, and an mth signal line SLm. The number of signal lines SL is m. m is an integer not less than 2. For example, in the case where the set of a red pixel, a green pixel, and a blue pixel is used as one component, the number of components is 1600. In the case where the number of components is 1600, m is 1600×3=4800. The signal lines SL are provided according to the number of multiple pixels arranged along the first direction. In the embodiment, m is arbitrary.

As described above, for example, the multiple third lines L3 are the common lines CL. The multiple common lines CL include, for example, a first common line CL1, a second common line CL2, and an Nth common line CLN. The number of common lines CL is N. N is an integer not less than 2. In the embodiment, N is arbitrary.

As described above, for example, the multiple fourth lines L4 are sense lines RL. The multiple sense lines RL include, for example, a first sense line RL1, a second sense line RL2, and an Mth sense line RLM. The number of sense lines RL is M. M is an integer not less than 2. In the embodiment, M is arbitrary.

In the example, the signal lines SL and the common lines CL are disposed between the gate lines GL and the sense lines RL. In the embodiment, various modifications are possible for the arrangement of these lines in the fifth direction. In other words, it is possible to arbitrarily change the vertical relationship between the gate lines GL, the signal lines SL, the common lines CL, and the sense lines RL.

As described below, the display is performed using the multiple gate lines GL, the multiple signal lines SL, and the multiple common lines CL. In the example, for example, an input (e.g., a touch input) is performed using the multiple common lines CL and the multiple sense lines RL. In the embodiment, the sense lines RL may be omitted in the case where the input operation is not performed.

As described below, the circuit unit 75 recited above is electrically connected to at least one of the multiple second lines L2 (the signal lines SL) and at least one of the multiple third lines (the common lines CL).

As shown in FIG. 3, for example, the number m of signal lines SL is larger than the number N of common lines CL. By setting the number of signal lines SL to be large, a high definition display can be implemented. On the other hand, there are many cases where the resolution of the input may be lower than the resolution of the display. Therefore, the number of common lines CL can be smaller than the number of gate lines GL. By setting the number of common lines CL to be small, the time necessary for the sense operation can be shorter; and a display having no incongruity or low incongruity becomes possible.

For example, the multiple signal lines SL are divided into multiple groups. For example, the multiple signal lines SL include first to kth groups, etc. Each of the multiple groups includes multiple mutually-adjacent signal lines SL. For example, the number of signal lines SL included in one group is j. j is an integer not less than 2.

For example, each of the groups of the multiple signal lines SL and one common line CL (i.e., the multiple common lines CL respectively) overlap when projected onto the X-Y plane.

Figure 4:
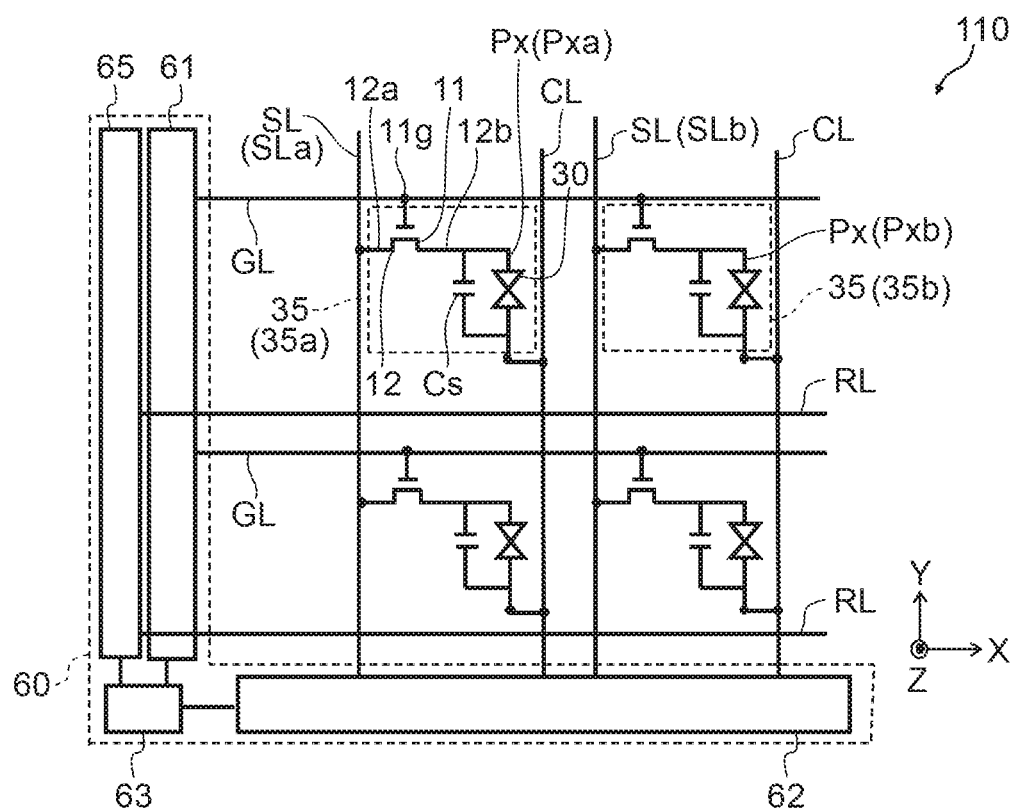
FIG. 4 is a schematic view showing the display device according to the first embodiment.

FIG. 4 is a schematic view showing the display device according to the first embodiment.

As shown in FIG. 4, multiple switch elements 11, multiple pixel electrodes Px, and the display function layer 30 are provided in the display device 110. The switch elements 11 and the pixel electrodes Px are included in the display unit DP. Each of the multiple switch elements 11 is electrically connected to one of the multiple first lines L1 (the gate lines GL) and one of the multiple second lines L2 (the signal lines SL).

For example, the switch element 11 includes a gate 11g and a semiconductor layer 12. The semiconductor layer 12 includes a first portion 12a and a second portion 12b. The gate 11g is electrically connected to one of the multiple gate lines GL. The first portion 12a of the semiconductor layer 12 is electrically connected to one of the multiple signal lines SL.

The multiple pixel electrodes Px are electrically connected respectively to the multiple switch elements 11. For example, one pixel electrode Px is electrically connected to the second portion 12b of the semiconductor layer 12 of the switch element 11.

The display function layer 30 performs an optical operation based on an electrical signal applied to the multiple pixel electrodes Px. The optical operation includes at least one of light emission or a change of an optical characteristic. As described below, for example, the display function layer 30 is provided between the multiple pixel electrodes Px and the multiple sense lines RL. The drive element 71 is capable of outputting the electrical signal applied to the pixel electrodes Px to the circuit unit 75. The electrical signal is supplied to the pixel electrodes Px via the drive element 71.

In the case where a liquid crystal layer is used as the display function layer 30, the optical operation includes a change of an optical characteristic. The optical characteristic includes, for example, at least one of birefringence, optical rotatory properties, scattering properties, light reflectance, or light absorptance. For example, the electrical signal that is applied to the pixel electrodes Px generates an electric field between the pixel electrodes Px and the common lines CL or between the pixel electrodes Px and common electrodes connected to the common lines CL. The liquid crystal alignment of the display function layer 30 (the liquid crystal layer) changes due to the electric field that is generated; and the effective birefringence changes. At least one of optical rotatory properties, scattering properties, light reflectance, or light absorptance may change. Although a liquid crystal layer is used as the display function layer 30 in the display device 110 shown in FIG. 4, a light emitting layer may be used instead of the liquid crystal layer in the display device 110.

In the case where a light emitting layer (e.g., an organic light emitting layer) is used as the display function layer 30, the optical operation includes light emission (the emission of light). In the case where organic electro luminescence is used as an example of the organic light emitting layer, electrons move from one electrode; and holes move from the other electrode. The light emission is produced by the electrons and the holes recombining in the light emitting layer. Also, it is possible to use an inorganic light emitting layer instead of the organic light emitting layer as the light emitting layer.

In other words, the display function layer 30 performs an optical operation of at least one of light emission or a change of an optical characteristic.

In the case where, for example, a liquid crystal layer is used as the display function layer 30, the display function layer 30 is used as a load capacitance. In the example shown in FIG. 4, a storage capacitor Cs is provided in parallel with the display function layer 30. The storage capacitor Cs may be provided as necessary and may be omitted.

Multiple pixels 35 are provided in the display device 110. At least one switch element 11 and at least one pixel electrode Px are provided in each of the multiple pixels 35. In other words, the multiple switch elements 11 are provided respectively in the multiple pixels 35. The multiple pixel electrodes Px are provided respectively in the multiple pixels 35.

As shown in FIG. 4, a drive unit 60 is provided in the display device 110.

The drive unit 60 includes, for example, a first drive circuit 61, a second drive circuit 62, and a controller 63. The first drive circuit 61 is electrically connected to the multiple gate lines GL. The second drive circuit 62 is electrically connected to the multiple signal lines SL and the multiple common lines CL. The controller 63 is electrically connected to the first drive circuit 61 and the second drive circuit 62. The appropriate signal processing of the electrical signals acquired by the controller 63 is performed. The electrical signals for which the signal processing is performed are supplied to the first drive circuit 61 and the second drive circuit 62. The electrical signals include the image signal.

The optical operation of the display function layer 30 (e.g., the liquid crystal layer) at the multiple pixels 35 is controlled by the gate lines GL, the signal lines SL, the switch elements 11, and the pixel electrodes Px. In the display operation, for example, the common lines CL are utilized as counter electrodes of the pixel electrodes Px. In other words, the potential of each of the multiple pixel electrodes Px is controlled by the electrical signal being supplied to the pixel electrode Px via the switch element 11. The display is performed by the alignment of the liquid crystal changing due to the electric field generated by the pixel electrodes Px and the common lines CL.

For example, the first gate driver 76a and the second gate driver 76b shown in FIG. 1B are included in the first drive circuit 61. For example, the drive element 71 and the circuit unit 75 shown in FIG. 2 are included in the second drive circuit 62. In the case where the multiplexer 77 is provided, the multiplexer 77 may be included in the second drive circuit 62.

A sense circuit 65 may be further provided in the drive unit 60. The sense circuit 65 is electrically connected to the sense lines RL. In the sense operation, for example, the change of the capacitance that is formed between each of the multiple common lines CL and each of the multiple sense lines RL is sensed by the second drive circuit 62 and the sense circuit 65. For example, the sensor 83 shown in FIG. 1A is included in the sense circuit 65.

For example, the touch input to the display device 110 is sensed by the multiple sense lines RL and the multiple common lines CL. In the sense operation, for example, an input member (e.g., an input pen, etc.), a finger of a viewer (a user) of the display device 110, etc., is in contact with or proximal to the display device 110. The electrostatic capacitance that is formed by the sense lines RL and the common lines CL changes due to the contact or proximity recited above. The touch input is sensed by sensing the change of the electrostatic capacitance. For example, electrostatic-capacitance type sensing is performed. It can be said that such a display device 110 is a display device that has an input function.

In the embodiment, the common lines CL (the third lines L3) are used as counter electrodes for the sensing while being used as counter electrodes for the display.

As shown in FIG. 4, the multiple pixels 35 include a first color pixel 35a and a second color pixel 35b. For example, the multiple pixel electrodes Px include a first color pixel electrode Pxa for the first color and a second color pixel electrode Pxb for the second color. The second color is different from the first color. The multiple signal lines SL include a first color line SLa and a second color line SLb. The first color line SLa is electrically connected to the first color pixel electrode Pxa via one of the multiple switch elements 11. The second color line SLb is electrically connected to the second color pixel electrode Pxb via one other of the multiple switch elements 11. Further, a third color pixel and a third pixel electrode may be provided. Accordingly, a third color line may be provided. Further, pixels 35 having four or more colors may be provided. An example of the case where pixels 35 of three colors are provided will now be described.

Figure 5:
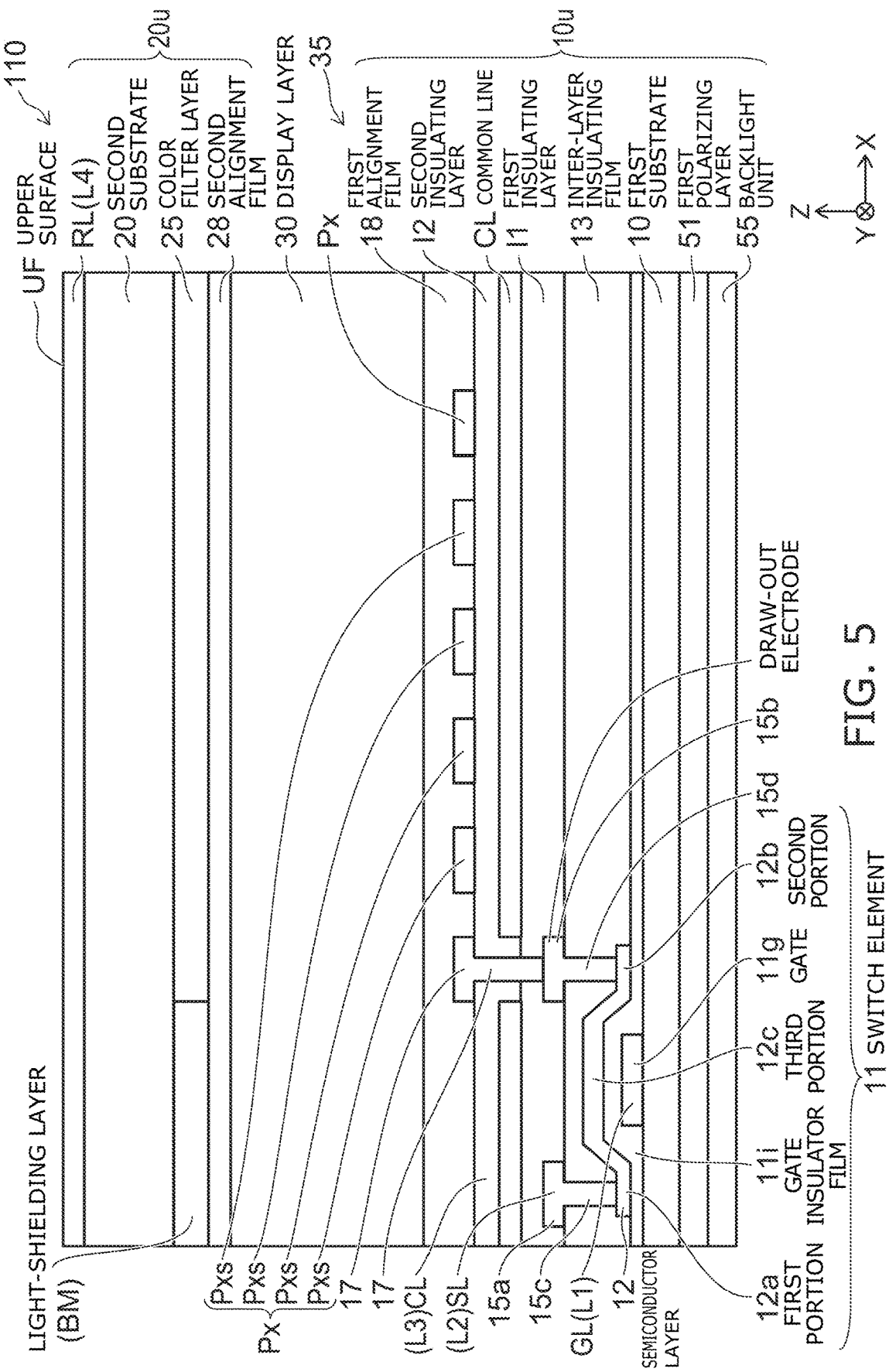
FIG. 5 is a schematic cross-sectional view showing the display device according to the first embodiment.

FIG. 5 is a schematic cross-sectional view showing the display device according to the first embodiment.

As shown in FIG. 5, the first substrate unit 10u, the second substrate unit 20u, and the display function layer 30 are provided in the display device 110. The multiple pixels 35 are provided in the display device 110. FIG. 5 shows a portion of one pixel 35.

For example, an array substrate is used as the first substrate unit 10u. For example, the first substrate 10, the gate lines GL (the first lines L1), the switch elements 11, the signal lines SL (the second lines L2), the common lines CL (the third lines L3), and the pixel electrodes Px are provided in the first substrate unit 10u.

For example, the gate lines GL and the signal lines SL extend in the X-Y plane. The first substrate unit 10u extends in the X-Y plane.

The first substrate 10 shown in FIG. 5 is light-transmissive. For example, glass or a resin is used as the first substrate 10. The gate lines GL are provided on the first substrate 10.

In the embodiment, a thin film transistor (TFT) is used as the switch element 11. The switch element 11 includes the semiconductor layer 12. The semiconductor layer 12 includes the first portion 12a, the second portion 12b, and a third portion 12c. The second portion 12b is separated from the first portion 12a in the X-Y plane. The third portion 12c is disposed between the first portion 12a and the second portion 12b. The first portion 12a is used as one of the source or drain of the switch element 11. The second portion 12b is used as the other of the source or drain. The third portion 12c is used as the channel portion of the switch element 11.

The switch element 11 further includes the gate 11g and a gate insulator film 11i. The gate insulator film 11i is provided between the third portion 12c and the gate 11g. In FIG. 5, the third portion 12c is disposed on the gate 11g. In the example, the switch element 11 has a bottom-gate structure. In the embodiment, the switch element 11 may have a top-gate structure.

A first metal layer is used as at least one of the gate line GL or the gate 11g. The first metal layer includes, for example, at least one of Mo (molybdenum), MoW (molybdenum-tungsten), Al (aluminum), or Cu (copper). For example, the first metal layer includes Mo. The gate line GL and the gate 11g may be formed using different materials or may be formed in the same layer using the same material. In the case where the gate line GL and the gate 11g are formed using the different material, a connection region is provided; and the gate line GL and the gate 11g are connected electrically.

The semiconductor layer 12 includes, for example, at least one of polysilicon, amorphous silicon, or crystalline silicon. An oxide semiconductor may be used as the semiconductor layer 12. For example, the semiconductor layer 12 may include an oxide including at least one of indium (In), gallium (Ga), or zinc (Zn).

The signal line SL is electrically connected to the first portion 12a. The signal line SL shown in FIG. 5 includes a first connection portion 15a in the region on an inter-layer insulating layer 13, and a first connecting conductive portion 15c in the region inside the inter-layer insulating layer 13. In FIG. 5, the first connecting conductive portion 15c which is a portion of the signal line SL is electrically connected to the first portion 12a.

On the other hand, a draw-out electrode that is connected to the pixel electrode Px is provided on the second portion 12b. The draw-out electrode includes a second connection portion 15b in the region on the inter-layer insulating layer 13, and a second connecting conductive portion 15d in the region inside the inter-layer insulating layer 13. In FIG. 5, the second connecting conductive portion 15d is electrically connected to the second portion 12b.

A second metal layer is used as the first connection portion 15a and the first connecting conductive portion 15c which are portions of the signal line SL and as the second connection portion 15b and the second connecting conductive portion 15d which are portions of the draw-out electrode. The second metal layer includes, for example, at least one of Al (aluminum) or Cu (copper). For example, the second metal layer includes Al.

The inter-layer insulating layer 13 is provided between the first connection portion 15a of the signal line SL and the semiconductor layer 12 and between the second connection portion 15b of the draw-out electrode and the semiconductor layer 12. As described above, the first connecting conductive portion 15c and the second connecting conductive portion 15d are provided inside the inter-layer insulating layer 13.

The inter-layer insulating layer 13 includes, for example, an oxide, a nitride, etc. The inter-layer insulating layer 13 includes, for example, at least one of silicon oxide, silicon nitride, or silicon oxynitride.

In FIG. 5, the common line CL is provided on the second metal layer of the signal line SL, etc. A first insulating layer I1 is provided between the common line CL and the signal line SL. The first insulating layer I1 is provided between the multiple signal lines SL and the multiple common lines CL.

For example, the first insulating layer I1 functions as a planarization layer. For example, the first insulating layer I1 includes an organic material. The first insulating layer I1 includes, for example, at least one of an acrylic resin or a polyimide resin. Good flatness is obtained by using the organic material as the first insulating layer I1. Instead of the organic material, an inorganic material may be used as the first insulating layer I1.

The pixel electrode Px is provided on the common line CL. In FIG. 5, the pixel electrode Px has a comb-shaped configuration; and the pixel electrode Px includes multiple portions Pxs. The multiple portions Pxs are separated from each other in the X-Y plane. The pixel electrode Px is electrically connected to the second connection portion 15b. In FIG. 5, a third connecting conductive portion 17 which is a portion of the pixel electrode Px is electrically connected to the second connection portion 15b.

For example, a light-transmissive conductive layer is used as at least one of the common line CL or the pixel electrode Px. For example, at least one of the common line CL or the pixel electrode Px includes an oxide including at least one element selected from the group consisting of In, Sn, Zn, and Ti. The common line CL and the pixel electrode Px include, for example, ITO (Indium Tin Oxide), etc. For example, thin metal layers that are light-transmissive may be used as the common line CL and the pixel electrode Px. As described below, a supplemental line may be provided for the common line CL.

A second insulating layer I2 is provided between the pixel electrode Px and the common line CL. In FIG. 5, at least a portion of the multiple common lines CL is disposed between at least a portion of one of the multiple pixel electrodes Px and at least a portion of one of the multiple signal lines SL. Also, the second insulating layer I2 is disposed between the at least a portion of the multiple common lines CL recited above and the at least a portion of the one of the multiple pixel electrodes Px recited above.

The second insulating layer I2 may include, for example, the same material as the first insulating layer I1; or a different material may be used. The material of the second insulating layer I2 is arbitrary.

In FIG. 5, a first alignment film 18 is provided on the pixel electrode Px.

The second substrate unit 20u is separated from the first substrate unit 10u in the Z-axis direction. In FIG. 5, the second substrate unit 20u includes the second substrate 20, a color filter layer 25, a second alignment film 28, and the sense lines RL (the fourth lines L4). The sense lines RL are separated from the switch elements 11 and the multiple pixel electrodes Px. The second substrate 20 is provided between the sense lines RL and the first substrate unit 10u. The color filter layer 25 is provided between the second substrate 20 and the first substrate unit 10u. The second alignment film 28 is provided between the color filter layer 25 and the first substrate unit 10u.

In FIG. 5, the second substrate 20 is light-transmissive. The second substrate 20 includes, for example, glass or a resin.

For example, a light-transmissive conductive material is used as the material of the sense line RL. The sense line RL includes an oxide (e.g., ITO, etc.) including at least one element selected from the group consisting of In, Sn, Zn, and Ti. A thin metal layer that is light-transmissive may be used as the sense line RL. A metal line may be used as the sense line RL. In the case where the metal line is used as the sense line RL, it is favorable for the metal line to be as fine as possible to not be visible. Also, in the case where the metal line is used as the sense line RL, it is necessary to suppress moiré that occurs due to the relationship of the arrangement between the metal lines, the arrangement between the metal line and the color filter layer 25 described below, and the arrangement between the metal line and the pixels. To suppress the moiré, the metal lines may have a configuration in which metal pieces having a prescribed length are disposed with a prescribed angle between mutually-adjacent metal pieces.

The color filter layer 25 includes, for example, a red colored layer, a green colored layer, a blue colored layer, etc. In the example, a light-shielding layer BM that shields the TFT is formed in the same layer as the color filter layer 25. The red colored layer, the green colored layer, and the blue colored layer are disposed to respectively correspond to the multiple pixels 35. The color filter layer 25 may have four or more colors. In the embodiment, the color filter layer 25 may be omitted. The color filter layer 25 may be provided in the first substrate unit 10$u$.

The first alignment film 18 and the second alignment film 28 include, for example, polyimide, etc. Alignment processing (e.g., rubbing, etc.) of these alignment films is performed as necessary. Or, a photo-alignment film may be used as the alignment film. For example, a photo-alignment film that is formed from a polyimide precursor may be used as such a photo-alignment film.

The display function layer 30 is provided between the first substrate unit 10$u$ and the second substrate unit 20$u$. The display function layer 30 is disposed between the multiple pixel electrodes Px and the multiple sense lines RL. For example, the display function layer 30 is disposed between the first alignment film 18 and the second alignment film 28.

A first polarizing layer 51 and a second polarizing layer 52 are provided in FIG. 5. The first substrate unit 10$u$ is disposed between the first polarizing layer 51 and the second polarizing layer 52. The second substrate unit 20$u$ is disposed between the first substrate unit 10$u$ and the second polarizing layer 52.

A backlight unit 55 is further provided in FIG. 5. The first polarizing layer 51, the first substrate unit 10$u$, the display function layer 30, and the second substrate unit 20$u$ are disposed between the backlight unit 55 and the second polarizing layer 52. The backlight unit 55 emits light. The light passes through the first polarizing layer 51, the first substrate unit 10$u$, the display function layer 30, the second substrate unit 20$u$, and the second polarizing layer 52 and is emitted outside the display device 110. The light that is modulated by the display function layer 30 is visible as an image.

In FIG. 5, the pixel electrode Px includes the multiple portions Pxs. A "lateral electric field" is generated between the pixel electrode Px and the common line CL. The lateral electric field is an electric field having a component parallel to the X-Y plane. The director (the long-axis direction of the liquid crystal molecules) of the liquid crystal molecules of the display function layer 30 (the liquid crystal layer) is caused to change in the X-Y plane by the lateral electric field. For example, at least one of birefringence or optical rotatory properties changes due to the change of the direction of the director. In other words, a change of an optical characteristic occurs. The change of the optical characteristic is converted to a change of the transmittance by using a polarizing layer.

The transmittance of the light emitted from the backlight unit 55 changes due to the change of the optical characteristic. The transmittance of the light changes, that is, the brightness changes, according to the electrical signal (the image signal) applied to the pixel electrode Px. The light of which the brightness has changed is emitted from an upper surface Uf of the display device 110. Thereby, the display is performed.

On the other hand, as described above, the touch input to the upper surface Uf of the display device 110 is sensed by the multiple sense lines RL and the multiple common lines CL from the change of the electrostatic capacitance that is formed. The touch input may be sensed by sensing at least one of an electric field generated between the multiple sense lines RL and a finger of a viewer, an input member, etc., or an electric field generated between the multiple common lines CL and the finger of the viewer, the input member, etc.

At least a portion of the drive unit 60 may be provided in the first substrate unit 10$u$. At least a portion of the drive unit 60 may be included in the drive device of the display device. At least a portion of the drive device may be included in the drive unit 60.

An example of the drive element 71 and the circuit unit 75 of the display device 110 will now be described.

Figure 6:
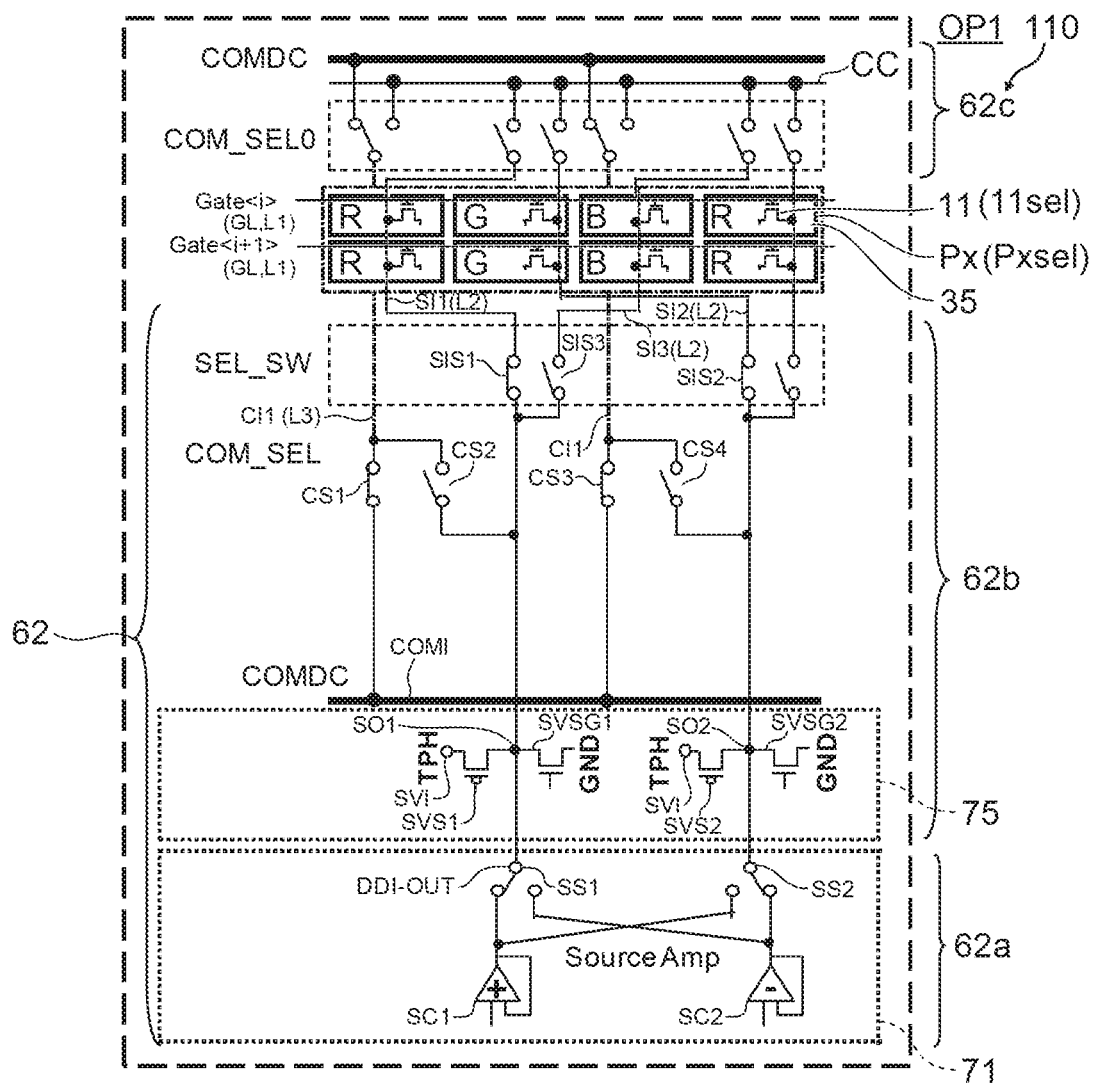
FIG. 6 is a schematic view showing the display device according to the first embodiment.

FIG. 6 is a schematic view showing the display device according to the first embodiment.

FIG. 6 shows a portion of the display device 110.

As shown in FIG. 6, the multiple first lines L1 (the gate lines GL) include an ith gate line Gate<i> and an (i+1)th gate line Gate<i+1>.

For example, FIG. 6 shows a display device in which the pixel electrodes Px corresponding to red (R), green (G), and blue (B) are disposed.

The multiple second lines L2 (the signal lines SL) include a first signal line SI1. For example, the first signal line SI1 corresponds to a first color pixel (e.g., an R color pixel). In the example, the multiple second lines L2 further include a second signal line SI2 and a third signal line SI3. For example, the second signal line SI2 corresponds to a second color pixel (e.g., a G pixel). For example, the third signal line SI3 corresponds to a third color pixel (e.g., a B pixel).

The multiple third lines L3 (the common lines CL) include a first common line CI1.

The second drive circuit 62 (the drive unit 60) includes a first source circuit SC1 and a second source circuit SC2. These source circuits are capable of outputting electrical signals used as at least a portion of the image signals. These source circuits are source amplifiers. For example, these source circuits are included in the drive element 71 (a first drive unit 62$a$).

The second drive circuit 62 further includes a sense potential line SVI, a first sense potential switch SVS1, a second sense potential switch SVS2, a first ground potential switch SVSG1, a second ground potential switch SVSG2, a first source switch SS1, and a second source switch SS2. For example, these switches are included in the circuit unit 75. In other words, these switches are provided between the drive element 71 and the first substrate 10. The circuit unit 75 includes, for example, the semiconductor layer 12 of the switch elements 11 included in the display unit DP. The circuit unit 75 includes the material included in at least one of the first metal layer or the second metal layer described above. An example is illustrated in FIG. 6 in which p-channel transistors are used as the first sense potential switch SVS1 and the second sense potential switch SVS2, and n-channel transistors are used as the first ground potential switch SVSG1 and the second ground potential switch SVSG2. The configuration is not limited to the example of FIG. 6. Switches having other configurations may be used as the first sense potential switch SVS1, the second sense potential switch SVS2, the first ground potential switch SVSG1, and the second ground potential switch SVSG2.

In other words, the circuit unit 75 includes switches; and the switches include the same material as the semiconductor layer 12 included in the switch elements 11. The circuit unit 75 includes the same material as the metal layer included in at least one of the first to third lines L1 to L3.

The second drive circuit 62 includes a display counter potential line COMI, a first signal line switch SIS1, a second signal line switch SIS2, a third signal line switch SIS3, a first common switch CS1, a second common switch CS2, a third common switch CS3, and a fourth common switch CS4. For example, these switches and the circuit unit 75 are included in a second drive unit 62b.

The display counter potential line COMI is set to a display counter potential COMDC. The display counter potential COMDC is, for example, 0 volts (e.g., a ground potential) to −1 volts. The value of the potential is an example; and the embodiment is not limited thereto.

The sense potential line SVI is set to a potential (e.g., a touch operation potential TPH) that is different from the display counter potential COMDC. The touch operation potential TPH (the sense potential) is, for example, 4 volts to 10 volts. The values of the potentials are examples; and the embodiment is not limited thereto.

One end of the first sense potential switch SVS1 is electrically connected to the sense potential line SVI (the touch operation potential TPH).

One end of the first ground potential switch SVSG1 is electrically connected to the other end SO1 of the first sense potential switch SVS1. The other end of the first ground potential switch SVSG1 is electrically connected to a ground potential GND. The ground potential GND is different from the sense potential.

One end of the second sense potential switch SVS2 is electrically connected to the sense potential line SVI.

One end of the second ground potential switch SVSG2 is electrically connected to the other end SO2 of the second sense potential switch SVS2. The other end of the second ground potential switch SVSG2 is connected to the ground potential GND.

One end (a terminal DDI-OUT) of the first source switch SS1 is connected to the other end SO1 of the first sense potential switch SVS1. The other end of the first source switch SS1 is connected to the output of the first source circuit SC1 or the output of the second source circuit SC2. In other words, the first source switch SS1 switches between the state in which the other end SO1 of the first sense potential switch SVS1 is connected to the output of the first source circuit SC1 and the state in which the other end SO1 of the first sense potential switch SVS1 is connected to the output of the second source circuit SC2.

One end of the second source switch SS2 is connected to the other end SO2 of the second sense potential switch SVS2. The other end of the second source switch SS2 is connected to the output of the second source circuit SC2 or the output of the first source circuit SC1. In other words, the second source switch SS2 switches between the state in which the other end SO2 of the second sense potential switch SVS2 is connected to the output of the second source circuit SC2 and the state in which the other end SO2 of the second sense potential switch SVS2 is connected to the output of the first source circuit SC1.

One end of the first signal line switch SIS1 is electrically connected to the first signal line SI1. The other end of the first signal line switch SIS1 is electrically connected to the other end SO1 of the first sense potential switch SVS1.

One end of the second signal line switch SIS2 is electrically connected to the second signal line SI2. The other end of the second signal line switch SIS2 is electrically connected to the other end SO1 of the second sense potential switch SVS2.

One end of the third signal line switch SIS3 is electrically connected to the third signal line SI3. The other end of the third signal line switch SIS3 is electrically connected to the other end SO1 of the first sense potential switch SVS1 (i.e., the other end of the first signal line switch SIS1).

One end of the first common switch CS1 is electrically connected to the display counter potential line COMI. The other end of the first common switch CS1 is electrically connected to the first common line CI1.

One end of the second common switch CS2 is electrically connected to the other end SO1 of the first sense potential switch SVS1 (i.e., the other end of the first signal line switch SIS1). The other end of the second common switch CS2 is electrically connected to the first common line CI1.

One end of the third common switch CS3 is electrically connected to the display counter potential line COMI. The other end of the third common switch CS3 is electrically connected to the first common line CI1.

One end of the fourth common switch CS4 is electrically connected to the other end SO2 of the second sense potential switch SVS2 (i.e., the other end of the second signal line switch SIS2). The other end of the fourth common switch CS4 is electrically connected to the first common line CI1.

For example, the first signal line switch SIS1, the second signal line switch SIS2, and the third signal line switch SIS3 are included in a selector switch SEL_SW.

For example, the first common switch CS1, the second common switch CS2, the third common switch CS3, and the fourth common switch CS4 are included in a common selector COM_SEL.

In FIG. 6, another common selector COM_SEL0 is provided. The gate lines GL are disposed between the common selector COM_SEL0 and the selector switch SEL_SW. The common selector COM_SEL0 electrically connects each of the common lines CL (e.g., the first common line CI1) to one of the display counter potential COMDC or an line CC. The common selector COM_SEL0 and the line CC are included in a third drive unit 62c.

Thus, the drive unit 60 includes the common selector COM_SEL, the selector switch SEL_SW, and the display counter potential line COMI that is set to the display counter potential COMDC. One end of the circuit unit 75 is electrically connected to the drive element 71. The other end of the circuit unit 75 is electrically connected to the selector switch SEL_SW and the common selector COM_SEL.

In the display device 110, a first operation and a second operation are implemented by these circuits. The first operation is, for example, the display operation. The second operation is the non-display operation. The second operation is, for example, the input sensing operation.

FIG. 6 shows the first operation OP1 of the display device 110.

In the first operation OP1 as shown in FIG. 6, the selector switch SEL_SW electrically connects the circuit unit 75 and each of the multiple second lines L2 (the signal lines SL). In FIG. 6, the first signal line switch SIS1 and the second signal line switch SIS2 are in the conducting state; and the third signal line switch SIS3 is in the nonconducting state.

The common selector COM_SEL electrically connects the display counter potential line COMI and each of the multiple third lines L3 (the common lines CL). Thereby, the electrical signals that include the desired image signals are supplied to the signal lines SL from the drive element 71. The signals based on the image signals supplied to the signal lines SL are supplied to the pixel electrodes Px. A display that corresponds to the potential difference generated between the pixel electrodes Px and the common lines CL is performed in the display function layer 30. In FIG. 6, the first common switch CS1 and the third common switch CS3 are in the conducting state; and the second common switch CS2 and the fourth common switch CS4 are in the nonconducting state.

The timing of the conducting state or the nonconducting state of the switches for each operation is described below.

In the display period of the first operation OP1, one of the multiple switch elements 11 connected to one of the multiple first lines L1 and one of the multiple second lines L2 is selected. The switch element 11 that is selected is called a selection switch element 11sel. An image potential is applied to the pixel electrode (a selection pixel electrode Pxsel) electrically connected to the selection switch element 11sel of the multiple pixel electrodes Px. On the other hand, the display counter potential COMDC is applied to at least one of the multiple third lines L3. In the first operation OP1, the image signal is supplied to the multiple second lines L2 while setting one of the multiple first lines L1 to the select potential. The multiple switch elements 11 include the selection switch element 11sel. The selection switch element 11sel is electrically connected to the first line L1 of the multiple switch elements 11 set to the select potential recited above. The multiple pixel electrodes Px include the selection pixel electrode Pxsel. The selection pixel electrode Pxsel is electrically connected to the selection switch element 11sel. The selection pixel electrode Pxsel is set to an image potential based on the image signal. On the other hand, at least one of the multiple third lines L3 is set to the display counter potential COMDC. Thereby, the display is performed.

Figure 7:
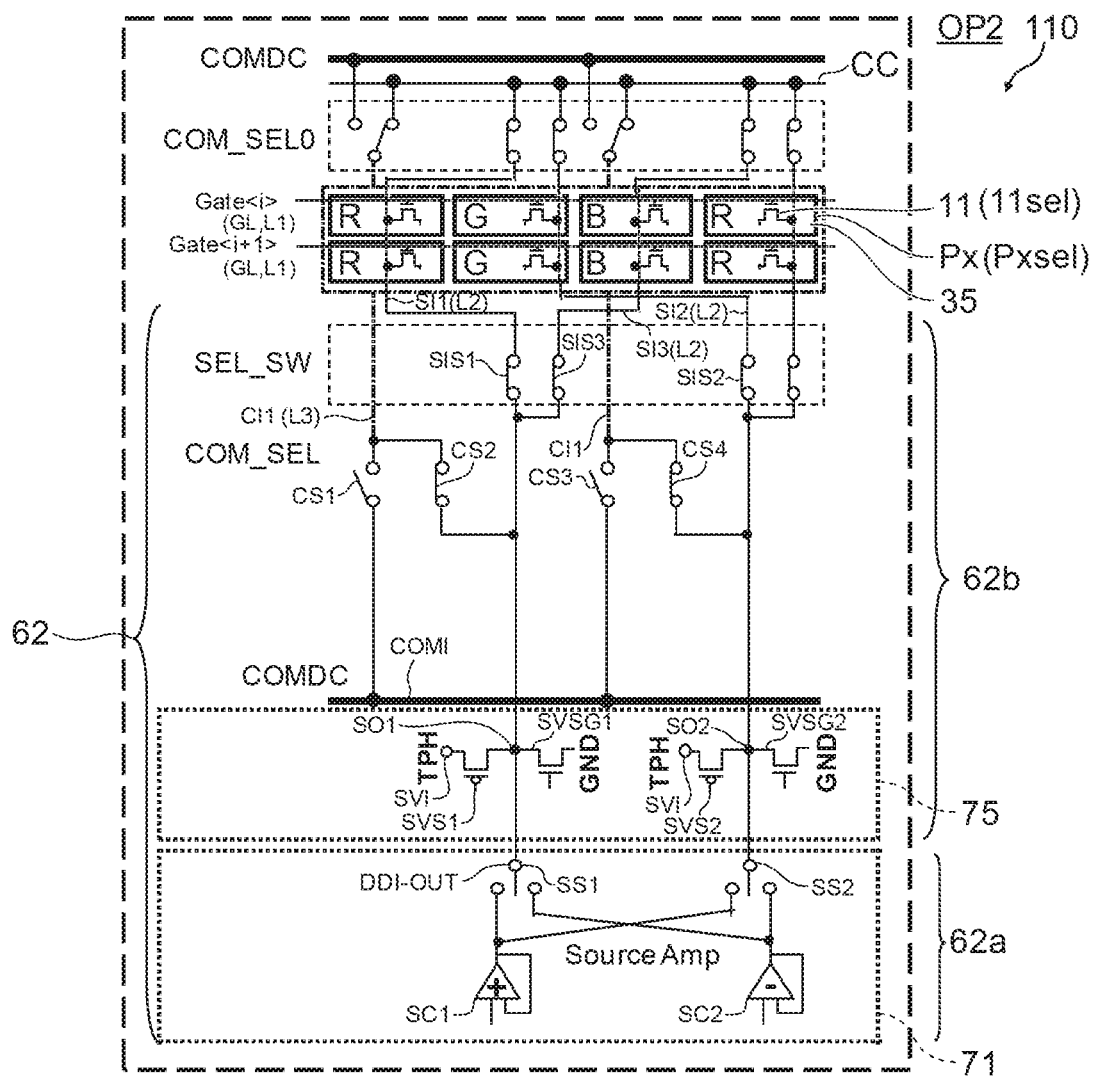
FIG. 7 is a schematic view showing the display device according to the first embodiment.

FIG. 7 is a schematic view showing the display device according to the first embodiment.

FIG. 7 shows a portion of the display device 110. FIG. 7 shows the state of the second operation OP2 of the display device 110.

In the second operation OP2 as shown in FIG. 7, neither the first source switch SS1 nor the second source switch SS2 are connected to any line. Therefore, the circuit unit 75 electrically disconnects the drive element 71 from each of the multiple second lines L2 (the signal lines SL).

The common selector COM_SEL electrically connects at least one of the multiple third lines L3 (the common lines CL) and at least one of the multiple second lines L2 (the signal lines SL). An example is illustrated in FIG. 7 in which the second common switch CS2 of the common selector COM_SEL is in the conducting state, and the first signal line switch SIS1 and the third signal line switch SIS3 are in the conducting state. Thereby, in the second operation OP2, the second lines L2 are set to the same potential as the potential of the third lines L3.

Thus, in the second operation OP2, a capacitance substantially is not formed between the second lines L2 and the third lines L3. For example, when performing the sense operation using the third lines L3 and the fourth lines L4, the load capacitance can be small; and a high-speed operation is possible.

According to the embodiment as described in regard to FIGS. 1A and 1B and FIG. 2, because the circuit unit 75 is disposed under the drive element 71, the surface area of the peripheral region 10P can be small; and the device can be compact.

Figure 8:
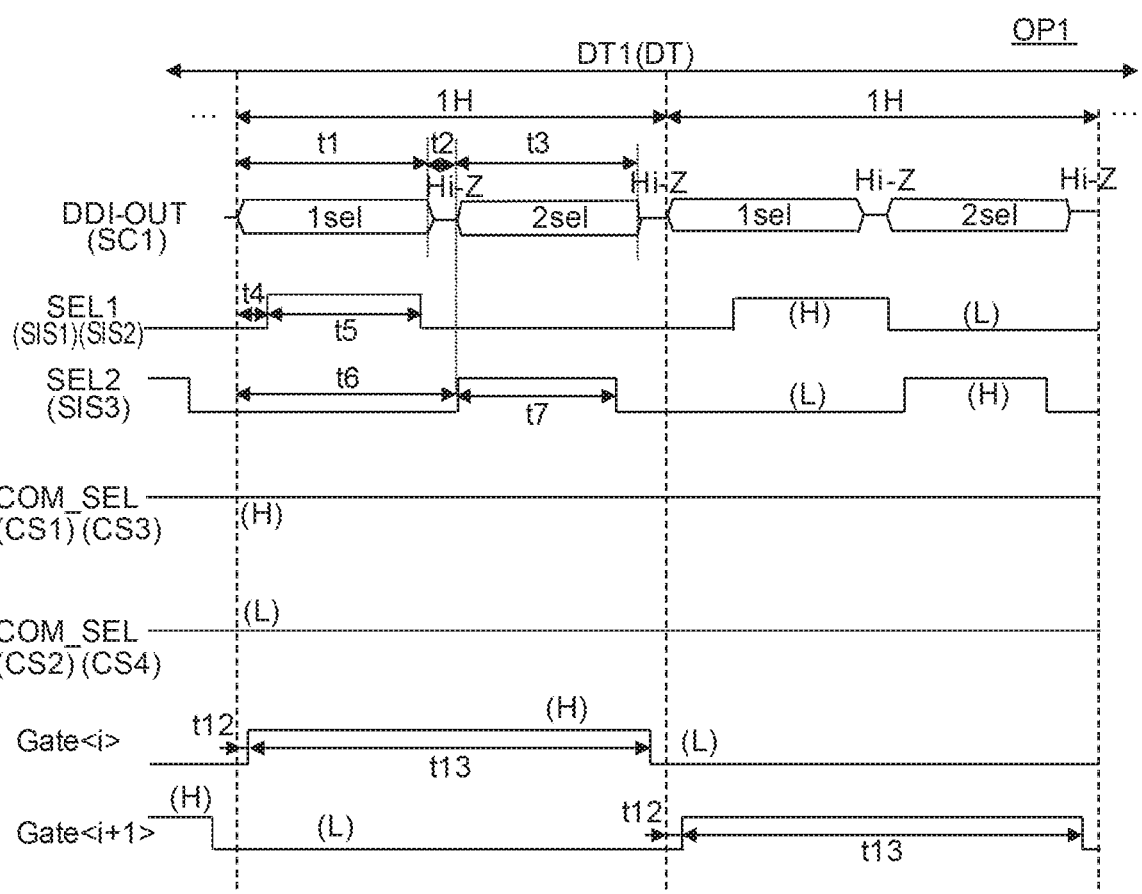
FIG. 8 is a schematic view showing the first operation of the display device according to the first embodiment.

FIG. 8 is a schematic view showing the first operation of the display device according to the first embodiment.

FIG. 8 is a timing chart of the first operation OP1. The horizontal axis of FIG. 8 is time.

The first operation OP1 is implemented in a display period DT as shown in FIG. 8. For example, the display period DT includes a first display period DT1 to a kth display period. In the first display period DT1, the first to kth gate lines GL are scanned by being sequentially selected. In a second display period (not shown), the (k+1)th to 2kth gate lines GL are scanned by being sequentially selected. The scanning period (1H) of the ith gate line Gate<i> and the scanning period (1H) of the (i+1)th gate line Gate<i+1> that are included in the first display period DT1 are shown in FIG. 8.

In the example, for example, the output of the terminal DDI-OUT corresponds to the output of the first source circuit SC1.

A signal SEL1 is the signal that determines the conducting state or the nonconducting state of the first signal line switch SIS1. The signal of the second signal line switch SIS2 is the same as the signal of the first signal line switch SIS1. A signal SEL2 is the signal of the third signal line switch SIS3. For these signals, these switches are in the conducting state in the high state "H." In the low state "L," these switches are in the nonconducting (disconnected) state.

For the first to fourth common switches CS1 to CS4 of the common selector COM_SEL, these common switches electrically conduct in the high state "H." In the low state "L," these common switches are in the electrically nonconducting (disconnected) state.

In the first operation OP1 (the display operation), the switch elements 11 are in the electrically conducting state when the ith gate line Gate<i> and the (i+1)th gate line Gate<i+1> are in the high state "H." In the low state "L," the switch elements 11 are switched to the nonconducting (disconnected) state.

For example, the ith gate line Gate<i> is switched to the conducting state in one period of 1H. The time between the start of an period of 1H and the start of the conducting state of the gate line is a time t12. Subsequently, the conducting state is provided for a time t13. In one other period of 1H, the (i+1)th gate line Gate<i+1> is switched to the conducting state.

The first source circuit SC1 outputs an image signal 1sel for a time t1 inside the period of 1H. For a time t2 (an period of a high resistance state Hi-Z (high impedance)) after the time t1, the first source circuit SC1 pauses the output of the image signal. For a time t3 after the time t2, the first source circuit SC1 outputs an image signal 2sel. For a time (the state of the high resistance state Hi-Z) after the time t3, the first source circuit SC1 pauses the output of the image signal.

For a time t5, the first signal line switch SIS1 and the second signal line switch SIS2 are switched to the high state "H." The time between the start of the time t1 and the start of the time t5 is a time t4. The first signal line switch SIS1 and the second signal line switch SIS2 are in the low state "L" for the time t2 and the time t3.

The third signal line switch SIS3 is in the low state "L" for the time t1. The time between the start of the time t1 and the start of the time t5 is the time t4. The third signal line switch SIS3 is switched to the high state "H" for a time t7. The time between the start of the time t1 and the start of the time t7 is a time t6.

On the other hand, the first common switch CS1 and the third common switch CS3 are in the high state "H." On the other hand, the second common switch CS2 and the fourth common switch CS4 are in the low state "L."

In other words, the following are implemented in the first operation OP1 (the display operation).

The first sense potential switch SVS1 electrically disconnects the other end of the first signal line switch SIS1 from the sense potential line SVI.

The first ground potential switch SVSG1 electrically disconnects the other end of the first signal line switch SIS1 from the ground potential GND.

The first source circuit SC1 outputs a signal of a portion of the image signal.

The first source switch SS1 electrically connects the first source circuit SC1 to the other end of the first signal line switch SIS1.

The first signal line switch SIS1 electrically connects the other end of the first source switch SS1 to the first signal line SI1.

The first common switch CS1 electrically connects the first common line CI1 and the display counter potential line COMI.

The second common switch CS2 electrically disconnects the first common line CI1 from the first signal line SI1.

Thereby, the desired display is performed at the pixels 35 corresponding to the first signal line SI1.

At this time, the third signal line switch SIS3 electrically disconnects the third signal line SI3 from the other end of the first source switch SS1.

Further, the following are performed in the first operation OP1.

The second sense potential switch SVS2 electrically disconnects the other end of the second signal line switch SIS2 from the sense potential line SVI.

The second ground potential switch SVSG2 electrically disconnects the other end of the second signal line switch SIS2 from the ground potential GND.

The second source circuit SC2 outputs a portion of the pixel signal. For example, the signal that is output from the second source circuit SC2 is different from the signal output from the first source circuit SC1. For example, the polarity of the signal output from the second source circuit SC2 is the reverse of the polarity of the signal output from the first source circuit SC1.

The second source switch SS2 electrically connects the second source circuit SC2 to the other end of the second signal line switch SIS2.

The second signal line switch SIS2 electrically connects the other end of the second source switch SS2 to the second signal line SI2.

The third common switch CS3 electrically connects the first common line CI1 and the display counter potential line COMI.

The fourth common switch CS4 electrically disconnects the first common line CI1 from the second signal line SI2.

Thereby, the desired display is performed at the pixels 35 corresponding to the second signal line SI2.

The following are performed in the case where the display is performed at the pixel electrodes Px corresponding to the third signal line SI3 (the period of the time t7).

The third signal line switch SIS3 electrically connects the third signal line SI3 to the other end of the first source switch SS1.

The first signal line switch SIS1 electrically connects the first signal line SI1 to the other end of the first source switch SS1.

Thereby, the desired display is performed at the pixels 35 corresponding to the third signal line SI3.

Figure 9:
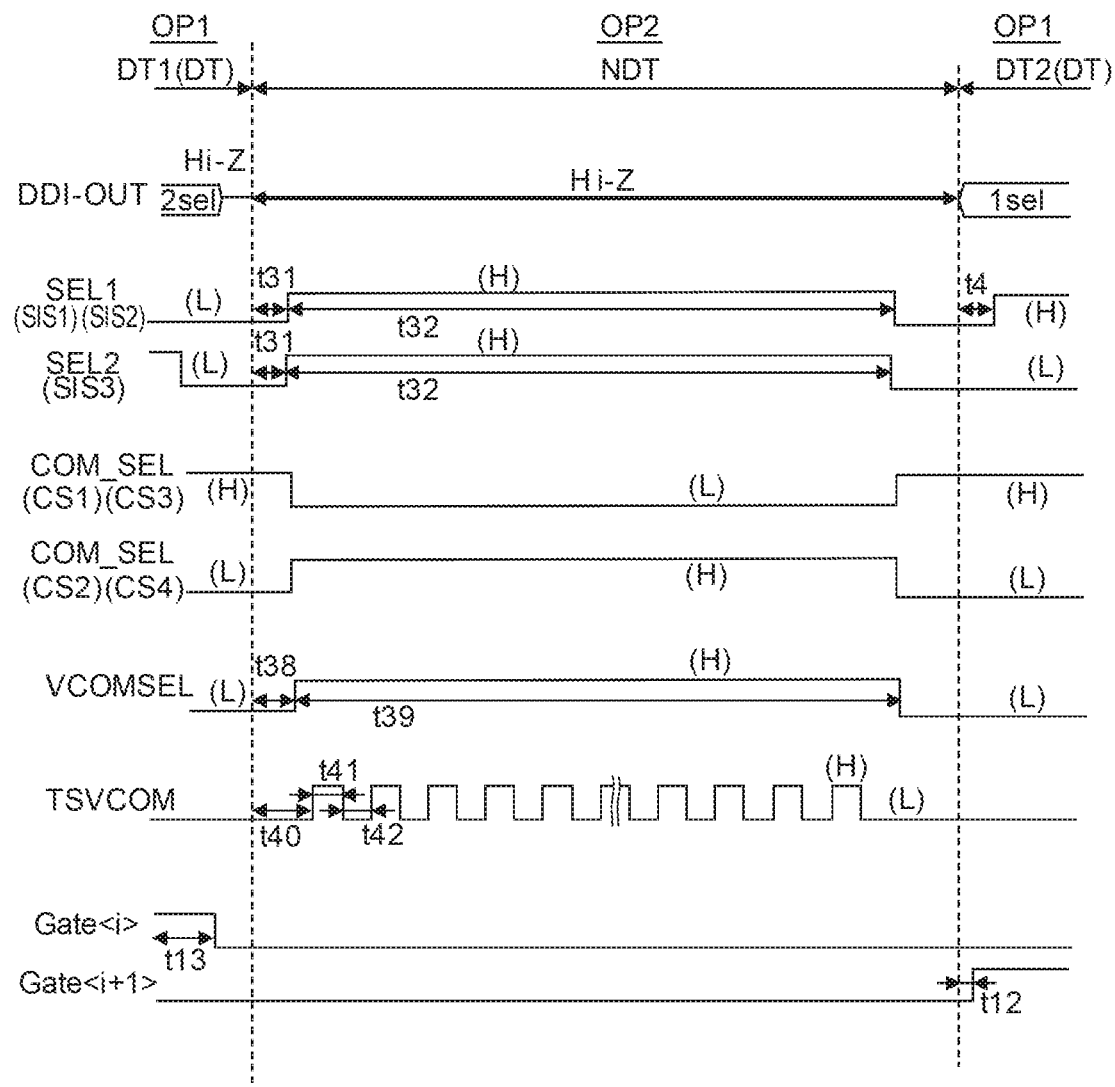
FIG. 9 is a schematic view showing the second operation of the display device according to the first embodiment.

FIG. 9 is a schematic view showing the second operation of the display device according to the first embodiment.

FIG. 9 is a timing chart of the second operation OP2 (the non-display operation) of the display device 110. The horizontal axis of FIG. 9 is time. In the embodiment, the sense operation is performed in the second operation OP2.

As shown in FIG. 9, the following are performed in the second operation OP2.

The terminal DDI-OUT is switched to the high resistance state Hi-Z. Namely, the first source switch SS1 electrically disconnects the first source circuit SC1 from the other end of the first signal line switch SIS1. The second source switch SS2 electrically disconnects the second source circuit SC2 from the other end of the second signal line switch SIS2.

A common selector signal VCOMSEL shown in FIG. 9 is, for example, the signal that controls the first to fourth common switches CS1 to CS4. The first common switch CS1 and the third common switch CS3 are switched to the nonconducting state when the common selector signal VCOMSEL is in the high state "H." The second common switch CS2 and the fourth common switch CS4 are switched to the conducting state when the common selector signal VCOMSEL is in the low state "L."

A signal TSVCOM shown in FIG. 9 is the signal that controls the conducting states of the first sense potential switch SVS1, the first ground potential switch SVSG1, the second sense potential switch SVS2, and the second ground potential switch SVSG2. One of the sense potential switch or the ground potential switch is switched to the conducting state when the signal TSVCOM is in the high state "H." The other of the sense potential switch or the ground potential switch is switched to the conducting state when the signal TSVCOM is in the low state "L."

For example, by the control of the signal TSVCOM, the first sense potential switch SVS1 and the first ground potential switch SVSG1 electrically connect the other end of the first signal line SI1 to one of the sense potential line SVI or the ground potential GND.

The first signal line switch SIS1 electrically connects the first signal line SI1 to the other end SO1 of the first sense potential switch SVS1.

The first common switch CS1 electrically disconnects the first common line CI1 from the display counter potential line COMI.

The second common switch CS2 electrically connects the first common line CI1 to the other end SO1 of the first sense potential switch SVS1 (i.e., the first signal line SI1).

For example, the high-level potential (e.g., TPH) and the low-level potential (e.g., GND) are repeatedly applied alternately to the first common line CI1 by the first sense potential switch SVS1 and the first ground potential switch SVSG1. The current that flows between the multiple fourth lines L4 and the first common line CI1 is sensed.

Thereby, sensing that uses the first common line CI1 is performed.

Further, the following are performed in the second operation OP2.

The second sense potential switch SVS2 and the second ground potential switch SVSG2 electrically connect the other end of the second signal line SI2 to one of the sense potential line SVI or the ground potential GND.

The second signal line switch SIS2 electrically connects the second signal line SI2 to the other end SO2 of the second sense potential switch SVS2.

The third common switch CS3 electrically disconnects the first common line CI1 from the display counter potential line COMI.

The fourth common switch CS4 electrically connects the first common line CI1 to the other end SO2 of the second sense potential switch SVS2 (i.e., the first signal line SI1).

Further, the following are performed in the second operation OP2.

The third signal line switch SIS3 electrically connects the third signal line SI3 to the other end SO1 of the first sense potential switch SVS1.

Thereby, in the second operation OP2, the first signal line SI1, the second signal line SI2, the third signal line SI3, and the first common line CI1 are set to substantially the same potential. The sensing of the touch input is performed in this state.

As shown in FIG. 9, the time between the start of a non-display period NDT and the start of the high state "H" of the signal SEL1 and the signal SEL2 is a time t31. These signals are in the high state "H" in the period of a time t32.

The time between the start of the non-display period NDT and the start of the high state "H" of the common selector signal VCOMSEL is a time t38. The common selector signal VCOMSEL is in the high state "H" for a subsequent time t39.

In the non-display period NDT, the signal TSVCOM is repeatedly switched alternately between the high state "H" and the low state "L." The time of the high state "H" is a time t41. The time of the low state "L" is a time t42. The time between the start of the non-display period NDT and the start of the initial high state "H" of the signal TSVCOM is a time t40.

For example, the first operation OP1 described above is performed by the controller 63. The controller 63 is electrically connected to the circuit unit 75 and the drive element 71. The controller 63 causes the circuit unit 75 and the drive element 71 to implement the first operation OP1 and the second operation OP2 described below.

In the first operation OP1, the following are performed in the display period DT. While setting one of the multiple first lines L1 to the select potential, the image signals are supplied to the multiple second lines L2; the selection pixel electrode Pxsel is set to the image potential based on the image signal; and at least one of the multiple third lines L3 is set to the display counter potential COMDC.

On the other hand, in the non-display period NDT of the second operation OP2, the potential of at least one of the multiple second lines L2 is set to be the same as the potential of one of the multiple third lines L3. A state is formed in which the second lines L2 and the third lines L3 are in the same state. For example, the common selector COM_SEL is used to form this state.

Figure 10:
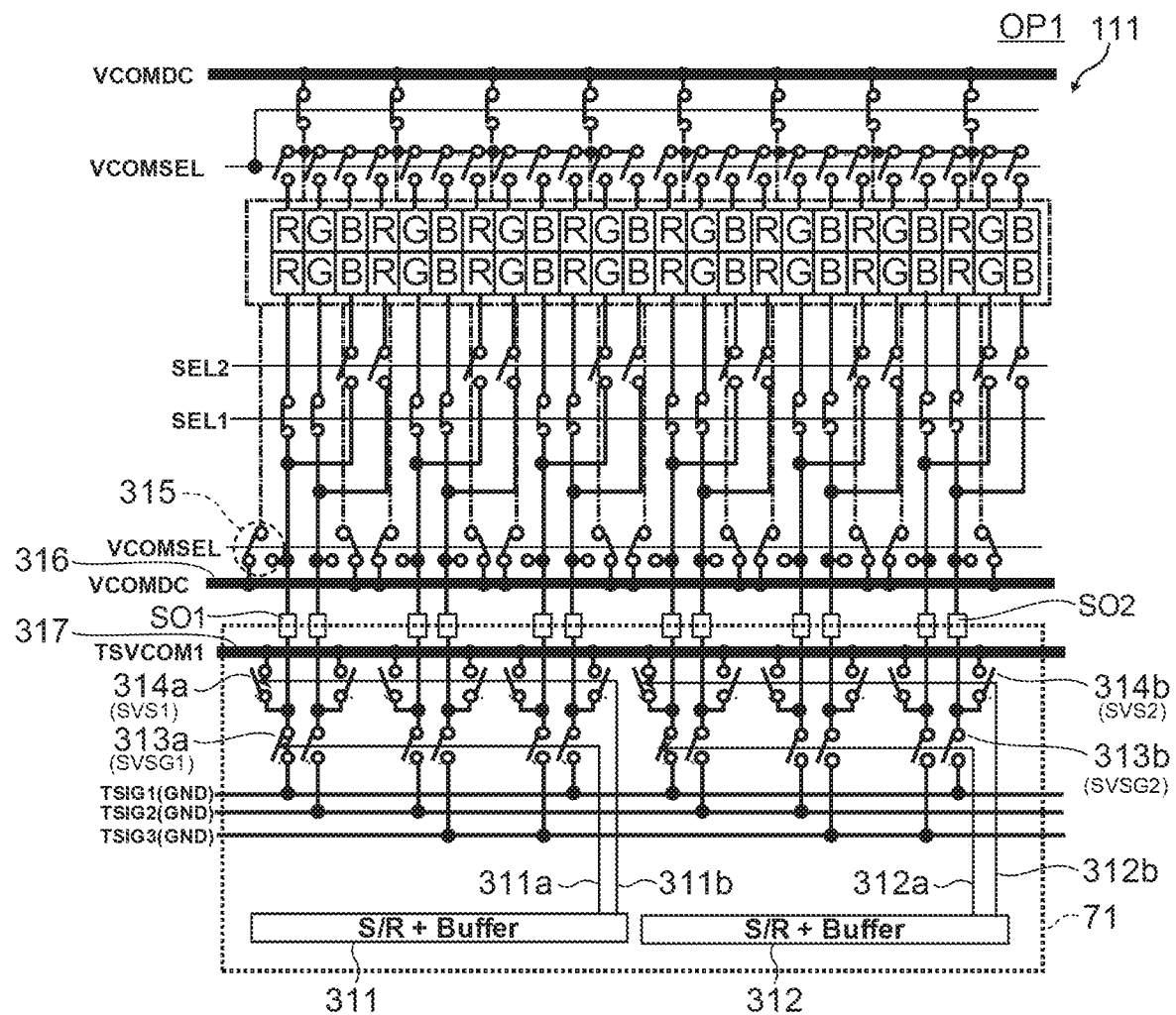
FIG. 10 is a circuit diagram showing the display device according to the first embodiment.
Figure 11:
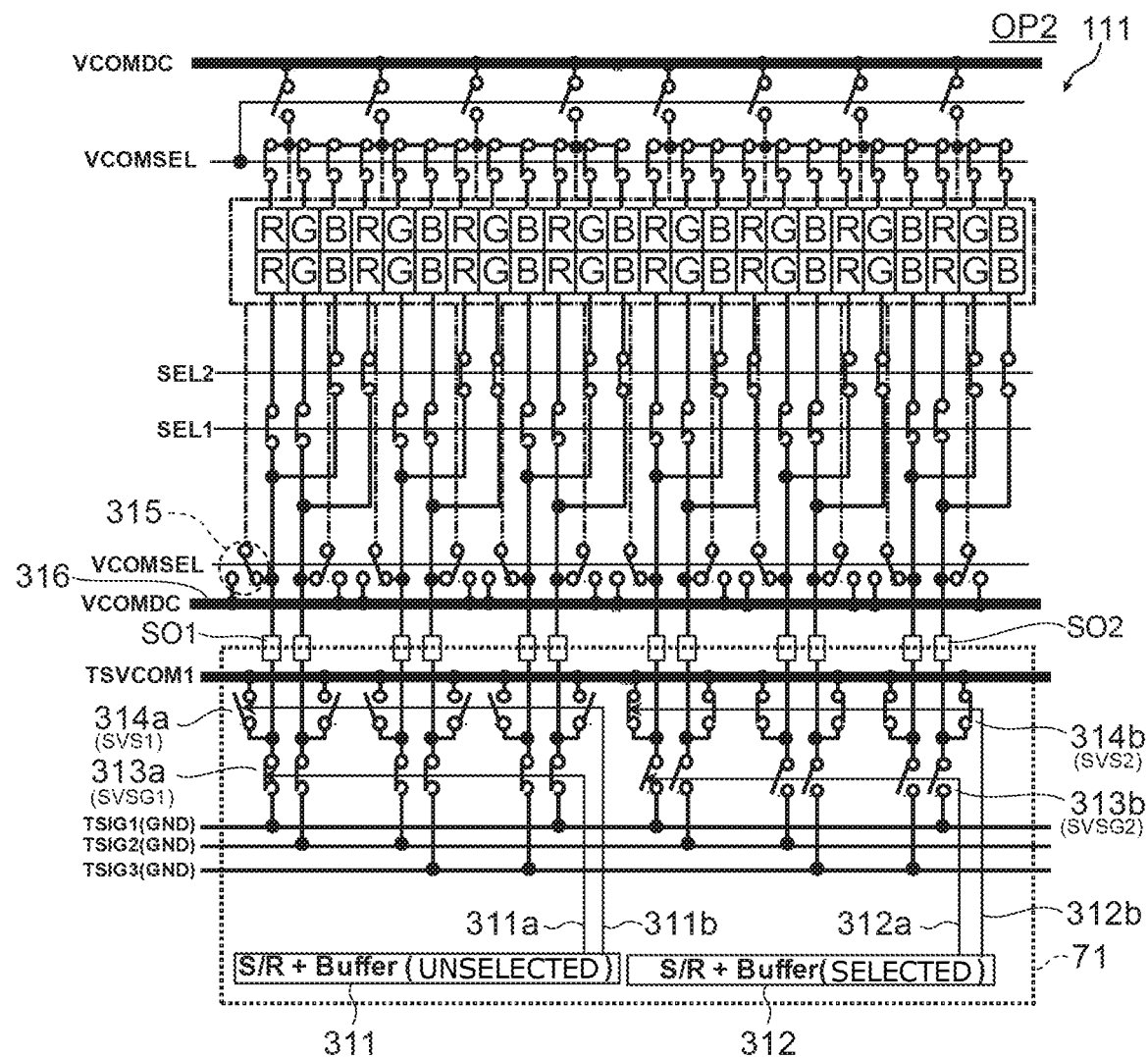
FIG. 11 is a circuit diagram showing the display device according to the first embodiment.

FIG. 10 and FIG. 11 are circuit diagrams showing the display device according to the first embodiment.

FIG. 10 corresponds to the first operation OP1; and FIG. 11 corresponds to the second operation OP2.

As shown in FIG. 10 and FIG. 11, the display device 111 according to the embodiment includes a first circuit 311 and a second circuit 312. The first circuit 311 and the second circuit 312 each include a shift register and a buffer.

A first output signal 311a that is output from the first circuit 311 controls the conducting state and nonconducting state of first switches 313a.

A second output signal 311b that is output from the first circuit 311 controls the conducting state and nonconducting state of second switches 314a.

A third output signal 312a that is output from the second circuit 312 controls the conducting state and nonconducting state of third switches 313b.

A fourth output signal 312b that is output from the second circuit 312 controls the conducting state and nonconducting state of fourth switches 314b.

An example is described hereinbelow in which the switch is in the conducting state when the signal input to the switch is in the high state "H," and the switch is in the nonconducting state when the signal input to the switch is in the low state "L." This is not limited thereto. A switch may be used in which the state is the conducting state when the input signal is in the low state "L," and the state is the nonconducting state when the input signal is in the high state "H."

For example, the first switches 313a correspond to the first ground potential switch SVSG1.

For example, the second switches 314a correspond to the first sense potential switch SVS1.

For example, the third switches 313b correspond to the second ground potential switch SVSG2.

For example, the fourth switches 314b correspond to the second sense potential switch SVS2.

One end of the first switch 313a is connected to one of lines TSIG1, TSIG2, TSIG3, or the like. These lines are set to a prescribed potential, e.g., the ground potential GND. The other end of the first switch 313a is connected to one end of the second switch 314a. The other end of the second switch 314a is connected to an line TSVCOM1. For example, the line TSVCOM1 is set similarly to the signal TSVCOM shown in FIG. 9.

The first switches 313a, the second switches 314a, the third switches 313b, and the fourth switches 314b correspond to the circuit unit 75 shown in FIG. 6 and FIG. 7.

In the first operation OP1 (the display operation) as shown in FIG. 10, for example, the switches to which the first output signal 311a and the second output signal 311b are input are switched to the nonconducting state when the first output signal 311a and the second output signal 311b are in the low state "L."

In the first operation OP1 (the display operation) as shown in FIG. 10, the first switches 313a, the second switches 314a, the third switches 313b, and the fourth switches 314b are switched to the nonconducting state. Switches 315 to which the common selector signal VCOMSEL is input are electrically connected to an line 316 to which a common electrode direct current potential VCOMDC is applied.

In the second operation OP2 (e.g., the sense operation of the touch input), in the case where the portion corresponding to the first circuit 311 is selected, for example, the first output signal 311a is in the low state; and the first switches 313a to which the first output signal 311a is input are switched to the nonconducting state. On the other hand, for example, the second output signal 311b is in the high state; and the second switches 314a to which the second output signal 311b is input are switched to the conducting state. The switches 315 to which the common selector signal VCOMSEL is input are electrically connected to an line 317 to which the signal TSVCOM is applied.

In the second operation OP2 as shown in FIG. 11, in the case where the portion corresponding to the first circuit 311 is not selected, for example, the first output signal 311a is in the high state; and the first switches 313a to which the first output signal 311a is input are switched to the conducting state. On the other hand, for example, the second output signal 311b is in the low state; and the second switches 314a to which the second output signal 311b is input are switched to the nonconducting state. The switches 315 to which the common selector signal VCOMSEL is input are electrically connected to the line TSIG1 to which the ground potential GND is applied.

For the second circuit 312, the case where the second circuit 312 is selected in the first operation OP1 and the second operation OP2 and the case where the second circuit 312 is not selected in the second operation OP2 are similar to those described above.

The first operation OP1 and the second operation OP2 are performed by the circuit configuration shown in FIG. 10 and FIG. 11. In the circuit configuration shown in FIG. 10 and FIG. 11, the first switches 313a, the second switches 314a, the third switches 313b, the fourth switches 314b, the first circuit 311, and the second circuit 312 are disposed between the drive element 71 and the first substrate 10 (not shown). Thereby, a compact display device 111 is possible.

In the display device 110 (the display device 111) according to the embodiment, the third lines L3 are aligned with the second lines L2. In such a structure, the operations of connection and non-connection between the second lines L2 and the third lines L3 are performed. In such a case, the circuit unit that performs such operations is disposed so that the circuit unit and the drive element 71 overlap. Thereby, a compact display device can be provided.

In the second operation OP2 (the sense operation of the touch input) of the display device 111, the signal TSVCOM is supplied to the signal lines SL (the second lines L2). For example, the ground potential GND is applied to the block of unselected common lines CL. For example, the first switches 313a and the third switches 313b are used as the switches between the common lines CL and the ground potential GND used at this time. In the embodiment, the drive element 71 and the path for supplying the signal TSVCOM that includes the scanner overlap.

In the example recited above, the second lines L2 are connected to the third lines L3 in the second operation OP2. The embodiment is not limited thereto. In the second operation OP2 (the non-display period NDT), the potential of at least one of the multiple second lines may be set to a floating potential. For example, in the second operation OP2, a capacitance is formed between the second lines L2 and the third lines L3 by fixing potentials of the second lines L2 to be different from the potentials of the third lines L3. Therefore, in the second operation OP2 (e.g., the sense operation), the load capacitance relating to the third lines L3 becomes large; and the operation speed decreases. Conversely, in the second operation OP2, by setting the second lines L2 to the floating potential, the capacitance can be small; and the operation speed can be increased.

For example, the first switches 313a, the third switches 313b, and the lines TSIG1 to TSIG3 recited above also can be used as the input of test signals. The operations of the display unit can be tested using the test signals. For example, the desired signals are input to the lines TSIG1 to TSIG3 while switching the first switches 313a and the third switches 313b. Thereby, the test can be performed. A simple test of the image quality can be performed prior to mounting the drive element 71 (the drive IC). In other words, these circuits are used in both the operation of touch sensing and the operation of testing.

Second Embodiment

Figure 12:
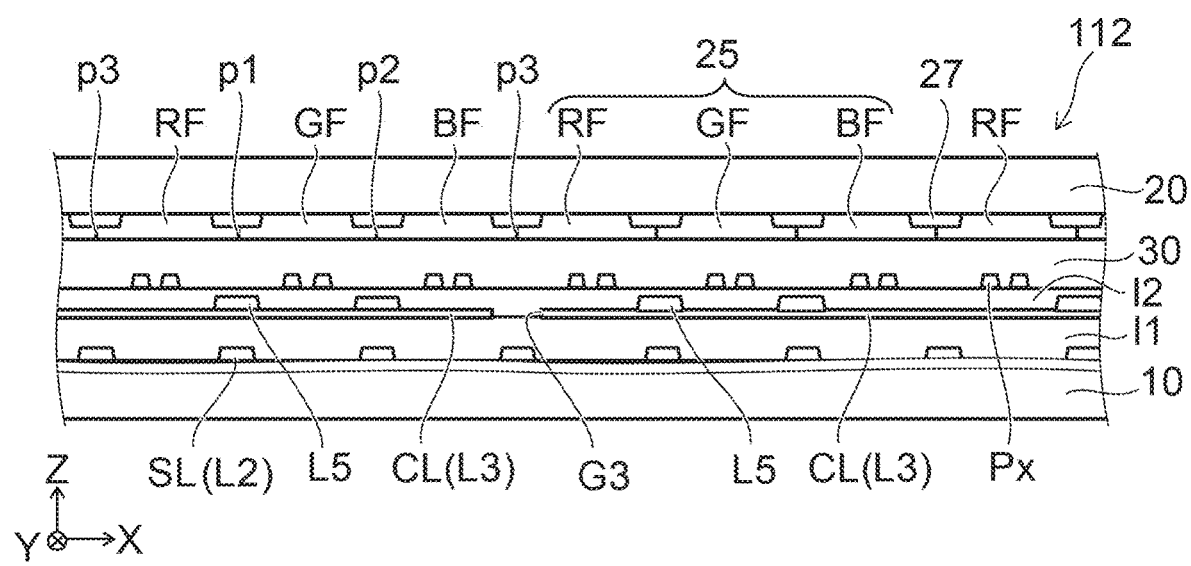
FIG. 12 is a schematic cross-sectional view showing a portion of a display device according to a second embodiment.

FIG. 12 is a schematic cross-sectional view showing a portion of a display device according to a second embodiment.

As shown in FIG. 12, the color filter layer 25 and multiple fifth lines L5 are further provided in the display device 112 according to the embodiment. Otherwise, the configuration described in regard to the display device 110 (the display device 111) is applicable.

The color filter layer 25 includes a red filter layer RF, a green filter layer GF, and a blue filter layer BF.

The color filter layer 25 includes a first boundary portion p1, a second boundary portion p2, and a third boundary portion p3. The first boundary portion p1 is the boundary portion between the red filter layer RF and the green filter layer GF. The second boundary portion p2 is the boundary portion between the green filter layer GF and the blue filter layer BF. The third boundary portion p3 is the boundary portion between the blue filter layer BF and the red filter layer RF.

The multiple fifth lines L5 extend in the second direction (e.g., the Y-axis direction). Each of the multiple fifth lines L5 is electrically connected to one of the multiple third lines L3. The electrical resistance of each of the multiple fifth lines L5 is lower than the electrical resistance of each of the multiple third lines L3. The fifth lines L5 are used as supplemental lines of the third lines L3.

As described above, a light-transmissive conductive material is used as the third line L3. On the other hand, the fifth line L5 includes a material (a metal or the like) having a low resistance. Thereby, the effective resistance of the third line L3 can be reduced. The occurrence of crosstalk can be suppressed.

In the example, the multiple fifth lines L5 overlap the first boundary portion p1 or the second boundary portion p2 when projected onto the X-Y plane. The fifth lines L5 and the third boundary portion p3 may not overlap.

The transmittance of the fifth line L5 is relatively low. The fifth line L5 functions as a light-shielding film. Because the visibility of green is high, there is a possibility that light leakage may occur at the first boundary portion p1 and the second boundary portion p2. In such a case, the light leakage can be suppressed by providing the fifth lines L5 so that the fifth lines L5 and the first boundary portion p1 overlap, and the fifth lines L5 and the second boundary portion p2 overlap. The display quality increases. On the other hand, the light leakage is suppressed at the third boundary portion p3 which is the boundary portion between red and blue which have low visibility. Therefore, the fifth line L5 and the third boundary portion p3 may not overlap.

In the example, the third boundary portion p3 and at least one of gaps G3 between the multiple third lines L3 overlap when projected onto the X-Y plane. A uniform display is obtained easily by disposing the gap G3 at the position of the third boundary portion p3 where the light leakage is low.

As shown in FIG. 12, a light-shielding layer 27 (e.g., a black matrix) may be further provided. When projected onto the X-Y plane, the light-shielding layer 27 has a portion that overlaps the first boundary portion p1, the second boundary portion p2, and the third boundary portion p3. Thereby, the light leakage can be suppressed further; and a higher-quality display is obtained.

The light-shielding layer 27 includes chrome, a chromic compound, etc. A black resin may be used as the light-shielding layer 27. A stacked film in which two or more of the red filter layer RF, the green filter layer GF, or the blue filter layer BF are stacked may be used as the light-shielding layer 27.

The configuration and operations described in regard to the first embodiment may be combined with the second embodiment.

Third Embodiment

Figure 13:
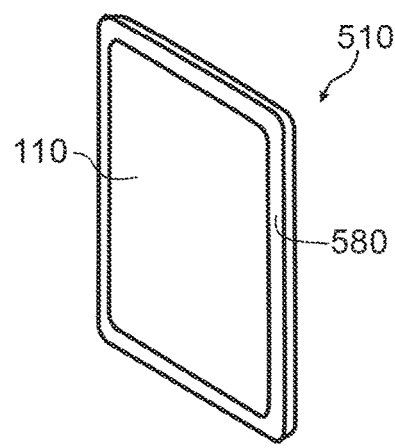
FIG. 13 is a schematic perspective view showing an electronic device according to a third embodiment.

FIG. 13 is a schematic perspective view showing an electronic device according to a third embodiment.

As shown in FIG. 13, the electronic device 510 according to the embodiment includes the display device 110 and a controller of the display device 110. The display devices and the modifications of the display devices described in regard to the first and second embodiments may be used as the display device. In the example, the electronic device 510 further includes a housing 580 having an interior in which the display device 110 is contained. For example, a mobile telephone, a personal digital assistant, a personal computer, various information devices, etc., are used as the electronic device 510.

In the electronic device 510 according to the embodiment, a compact electronic device can be provided by using the display devices according to the first and second embodiments.

According to the embodiment, a compact display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the line, the switch element, the display function layer, the insulating layer, the drive unit, the switch, the selector, the circuit, etc., from known art; and such practice is within the scope of the invention to the extent that similar effects can be obtained.

Further, any two or more components of the specific examples may be combined within the extent of technical feasibility and are within the scope of the invention to the extent that the spirit of the invention is included.

All display devices practicable by an appropriate design modification by one skilled in the art based on the display devices described above as embodiments of the invention are within the scope of the invention to the extent that the spirit of the invention is included.

Various modifications and alterations within the spirit of the invention will be readily apparent to those skilled in the art; and all such modifications and alterations should be seen as being within the scope of the invention.

For example, additions, deletions, or design modifications of components or additions, omissions, or condition modifications of processes appropriately made by one skilled in the art in regard to the embodiments described above are within the scope of the invention to the extent that the spirit of the invention is included.

Other effects produced by the forms described in the embodiment that are apparent from the specification or readily apparent to one skilled in the art naturally should be seen as being within the scope of the invention.

(1) An embodiment of the disclosed invention is a display device including:
  a first substrate unit including
    a first substrate having a first surface including a display region and a peripheral region,
    a display unit provided in the display region, the display unit including
      multiple first lines extending in a first direction and being arranged in a second direction intersecting the first direction, the first direction intersecting a direction from the peripheral region toward the display region,
      multiple second lines extending in the second direction and being arranged in the first direction,
      multiple switch elements, each of the multiple switch elements being electrically connected to one of the multiple first lines and one of the multiple second lines,
      multiple pixel electrodes electrically connected respectively to the multiple switch elements, and
      multiple third lines extending in the second direction and being arranged in the first direction, and
    a circuit unit provided in the peripheral region and electrically connected to at least one of the multiple second lines and at least one of the multiple third lines;
  a second substrate unit including
    a second substrate having a second surface and a third surface, the second surface opposing the first surface, the third surface being on a side opposite to the second surface, and
    multiple fourth lines provided at the third surface, the multiple fourth lines extending in a third direction and being arranged in a fourth direction, the third direction being parallel to the third surface and intersecting the second direction, the fourth direction being parallel to the third surface and intersecting the third direction;
  a display function layer provided between the first substrate unit and the second substrate unit, the display function layer performing an optical operation based on an electrical signal applied to the multiple pixel electrodes; and
  a drive element provided on the peripheral region, the drive element being capable of outputting the electrical signal to the circuit unit,
    at least a portion of the circuit unit being disposed between the drive element and the first substrate.

(2) An embodiment of the disclosed invention is the display device according to (1), further including a controller electrically connected to the circuit unit and the drive element,
  the controller causing the circuit unit and the drive element to implement a first operation and a second operation,
  the first operation including, in a display period:
    selecting one of the multiple switch elements, the one of the multiple switch elements being connected to one of the multiple first lines and one of the multiple second lines;
    applying an image potential to a pixel electrode of the multiple pixel electrodes electrically connected to the selected switch element; and applying a display counter potential to at least one of the multiple third lines, the second operation including, in a non-display period, setting a potential of at least one of the multiple second lines to the same potential as a potential of one of the multiple third lines.

(3) An embodiment of the disclosed invention is the display device according to (1) or (2), including a sensor sensing, in the second operation, a change of a capacitance formed between at least one of the multiple fourth lines and at least one of the multiple third lines.

(4) An embodiment of the disclosed invention is the display device according to (2) or (3), further including:

a display counter potential line set to the display counter potential;

a selector switch; and a common selector, one end of the circuit unit being electrically connected to the drive element, one other end of the circuit unit being electrically connected to the selector switch and the common selector, wherein:

in the first operation, the selector switch electrically connects the circuit unit and each of the multiple second lines, and the common selector electrically connects the display counter potential line and each of the multiple third lines, in the second operation, the circuit unit electrically disconnects the drive element from each of the multiple second lines, and the common selector electrically connecting at least one of the multiple third lines and at least one of the multiple second lines.

(5) An embodiment of the disclosed invention is the display device according to (2) or (3), including:

a sense potential line set to a sense potential different from the display counter potential; and a ground potential line having a potential different from the sense potential, the drive element including a source circuit capable of outputting a portion of the electrical signal, the circuit unit including:

a sense potential switch, one end of the sense potential switch being electrically connected to the sense potential line, one other end of the sense potential switch being electrically connected to an output of the source circuit; and a ground potential switch, one end of the ground potential switch being electrically connected to the sense potential line, one other end of the ground potential switch being connected to the ground potential line.

(6) An embodiment of the disclosed invention is the display device according to (5), wherein the multiple second lines include a signal line, and the display device further includes a signal line switch, one end of the signal line switch being connected to the first signal line, one other end of the signal line switch being connected to the one other end of the sense potential switch.

(7) An embodiment of the disclosed invention is the display device according to (6), wherein the multiple third lines include a common line, and the display device further includes:

a display counter potential line set to the display counter potential;

a first common switch, one end of the first common switch being connected to the common line, one other end of the first common switch being connected to the counter potential line; and a second common switch, one end of the second common switch being connected to the common line, one other end of the second common switch being connected to the signal line.

(8) An embodiment of the disclosed invention is the display device according to (7), wherein, in the first operation, the sense potential switch electrically disconnects the display counter potential line from the output of the source circuit, the ground potential switch electrically disconnects the ground potential line from the output of the source circuit, the signal line switch electrically connects the signal line to the output of the source circuit, the first common switch electrically connects the common line to the display counter potential line, and the second common switch electrically connects the common line to the signal line.

(9) An embodiment of the disclosed invention is the display device according to (7) or (8), wherein, in the second operation, the display counter potential line is electrically connected to one of the ground potential line or the output of the source circuit by the sense potential switch and the ground potential switch, the signal line switch electrically connects the signal line to the one other end of the ground potential switch, the first common switch electrically disconnects the common line from the display counter potential line, and the second common switch electrically connects the common line to the signal line.

(10) An embodiment of the disclosed invention is the display device according to (1), further including a controller electrically connected to the circuit unit and the drive element, the controller causing the circuit unit and the drive element to implement a first operation and a second operation, the first operation including, in a display period:

selecting one of the multiple switch elements, the one of the multiple switch elements being connected to one of the multiple first lines and one of the multiple second lines; and applying an image potential to a pixel electrode of the multiple pixel electrodes electrically connected to the selected switch element, and applying a display counter potential to at least one of the multiple third lines, the second operation including, in a non-display period, setting a potential of at least one of the multiple second lines to a floating potential.

(11) An embodiment of the disclosed invention is the display device according to any one of (1) to (10), further including a connecting conductive member, the drive element including a lower surface electrode provided at a surface of the drive element on the first substrate side, the first substrate unit further including an line electrode provided in the peripheral region, the connecting conductive member being disposed between the lower surface electrode and the line electrode to electrically connect the lower surface electrode and the line electrode.

(12) An embodiment of the disclosed invention is the display device according to any one of (1) to (11), wherein the drive element and the second substrate unit do not overlap when projected onto the first surface.

(13) An embodiment of the disclosed invention is the display device according to any one of (1) to (12), further including:

a color filter layer including a red filter layer, a green filter layer, and a blue filter layer; and multiple fifth lines extending in the second direction, the color filter layer including a first boundary portion between the red filter layer and the green filter layer, a second boundary portion between the green filter layer and the blue filter layer, and a third boundary portion between the blue filter layer and the red filter layer, each of the multiple fifth lines being electrically connected to one of the multiple third lines, an electrical resistance of each of the multiple fifth lines being lower than an electrical resistance of each of the multiple third lines, the multiple fifth lines overlapping the first boundary portion or the second boundary portion and not overlapping the third boundary portion when projected onto a plane including the first direction and the second direction.

(14) An embodiment of the disclosed invention is the display device according to (13), wherein the third boundary portion and at least one of gaps between the multiple third lines overlap when projected onto the plane including the first direction and the second direction.

(15) An embodiment of the disclosed invention is the display device according to any one of (1) to (12), further including a color filter layer including a red filter layer, a green filter layer, and a blue filter layer, the color filter layer including a first boundary portion between the red filter layer and the green filter layer, a second boundary portion between the green filter layer and the blue filter layer, and a third boundary portion between the blue filter layer and the red filter layer, the third boundary portion and at least one of gaps between the multiple third lines overlapping when projected onto the plane including the first direction and the second direction.

What is claimed is:

1. A display device comprising:
   a display region and a peripheral region,
   a plurality of pixels in the display region,
   a plurality of signal lines being arranged in a first direction and extending in a second direction intersecting the first direction,
   a plurality of common lines being arranged in the first direction and extending in the second direction,
   a signal supplying circuit for supplying a control signal with an amplitude and a period,
   a switching element including a first switch and a second switch, wherein the first switch is connected to one of the signal lines and the second switch is connected to one of the common lines,
   wherein
   the signal lines are provided according to the number of multiple pixels arranged along the first direction,
   the amplitude of the control signal is a difference between a high level potential and a low level potential,
   the display device is operated in a display operation and an input sensing operation,
   in the input sensing operation, the amplitude of the control signal supplied to at least one of the signal lines through the first switch is same as the amplitude of the control signal supplied to at least one of the common lines through the second switch.

2. The display device according to claim 1, wherein in the input sensing operation, the period of the control signal supplied to at least one of the signal lines is same as the period of the control signal supplied to at least one of the common lines.

3. The display device according to claim 1, wherein the common lines are provided opposing the signal lines.

4. The display device according to claim 1, further comprising:
   a circuit section provided in the peripheral region,
   a selector switch circuit,
   wherein
   the common lines extend beyond the selector switch circuit,
   in the display operation, the selector switch circuit electrically connects the circuit section and each of the plurality of signal lines.

5. The display device according to claim 1, wherein a touch input may be sensed by sensing an electric field generated between the common lines and an input object.

6. A display device comprising:
   a display region and a peripheral region,
   a plurality of pixels in the display region,
   a plurality of signal lines being arranged in a first direction and extending in a second direction intersecting the first direction,
   a plurality of common lines being arranged in the first direction and extending in the second direction,
   a circuit section provided in the peripheral region,
   a selector switch circuit,
   a switching element including a first switch and a second switch, wherein the first switch is connected to one of the signal lines and the second switch is connected to one of the common lines,
   wherein
   the signal lines are provided according to the number of multiple pixels arranged along the first direction,
   the common lines extend beyond the selector switch circuit,
   the display device is operated in a display operation and an input sensing operation,
   in the display operation, the selector switch circuit electrically connects the circuit section and each of the plurality of signal lines,
   in the display operation, the first switch is in a conducting state and the second switch is in a nonconductive state.

7. The display device according to claim 6, further comprising:
   a signal supplying circuit for supplying a control signal with an amplitude and a period,
   wherein
   the signal lines are provided according to the number of multiple pixels arranged along the first direction,
   the amplitude of the control signal is a difference between a high level potential and a low level potential in the input sensing operation, the amplitude of the control signal supplied to at least one of the signal lines is same as the amplitude of the control signal supplied to at least one of the common lines.

8. The display device according to claim 7, wherein in the input sensing operation, the period of the control signal supplied to at least one of the signal lines is same as the period of the control signal supplied to at least one of the common lines.

9. The display device according to claim 6, wherein the common lines are provided opposing the signal lines.

10. The display device according to claim 6, wherein a touch input may be sensed by sensing an electric field generated between the common lines and an input object.

* * * * *